(12) United States Patent
McAdam et al.

(10) Patent No.: US 11,040,591 B2
(45) Date of Patent: Jun. 22, 2021

(54) WHEELED WORK VEHICLE AND A SUSPENSION UNIT FOR A WHEELED WORK VEHICLE

(71) Applicant: MULTIHOG R&D LIMITED, Dundalk (IE)

(72) Inventors: James McAdam, Carlingford (IE); Gerard McHugh, Carrickmacross (IE); Anthony Duff, Dundalk (IE); Dallan McHugh, Dundalk (IE); Daniel McElchar, Castlefin (IE); Samuel Hampshire, Drogheda (IE)

(73) Assignee: MULTIHOG R&D LIMITED, Dundalk (IE)

( * ) Notice: Subject to any disclaimer, the term of this patent is extended or adjusted under 35 U.S.C. 154(b) by 303 days.

(21) Appl. No.: 15/781,723

(22) PCT Filed: Dec. 7, 2016

(86) PCT No.: PCT/IE2016/000023
§ 371 (c)(1),
(2) Date: Jun. 6, 2018

(87) PCT Pub. No.: WO2017/098492
PCT Pub. Date: Jun. 15, 2017

(65) Prior Publication Data
US 2018/0354337 A1    Dec. 13, 2018

(30) Foreign Application Priority Data
Dec. 7, 2015    (IE) .................................... 2015/0428

(51) Int. Cl.
*B60G 21/05*    (2006.01)
*E02F 9/08*    (2006.01)
(Continued)

(52) U.S. Cl.
CPC ........... *B60G 21/052* (2013.01); *B60G 7/001* (2013.01); *B60G 21/051* (2013.01);
(Continued)

(58) Field of Classification Search
CPC .... B60G 21/052; B60G 21/051; B60G 7/001; B60G 2300/082; B60G 2204/18;
(Continued)

(56) References Cited

U.S. PATENT DOCUMENTS 4,614,247 A * 9/1986 Sullivan .................... B60G 5/04
                                                        180/24.02
9,764,613 B2 * 9/2017 Rowe ...................... B60G 7/001
(Continued)

FOREIGN PATENT DOCUMENTS

DE    20 2013 004 035 U1    9/2014
EP         1 623 854 A1    2/2006
(Continued)

OTHER PUBLICATIONS

International Search Report for PCT/IE2016/000023 dated Feb. 10, 2017 [PCT/ISA/210].

*Primary Examiner* — Kevin Hurley
*Assistant Examiner* — Marlon A Arce
(74) *Attorney, Agent, or Firm* — Sughrue Mion, PLLC

(57) ABSTRACT

A wheeled work vehicle (1) comprises a forward chassis part (4) and a rearward chassis part (5) pivotally connected about a substantially vertically extending primary pivot axis (7) for steering thereof. A pair of forward ground engaging wheels (29) are carried on a forward suspension unit (32), and a pair of rearward ground engaging wheels (30) are carried on a rearward suspension unit (33). The forward suspension unit (32) is pivotally connected to the forward chassis part (4) by a pair of main forward transverse pivot shafts (63) pivotally coupled to the forward chassis part (4) by corresponding
(Continued)

Figure 1:
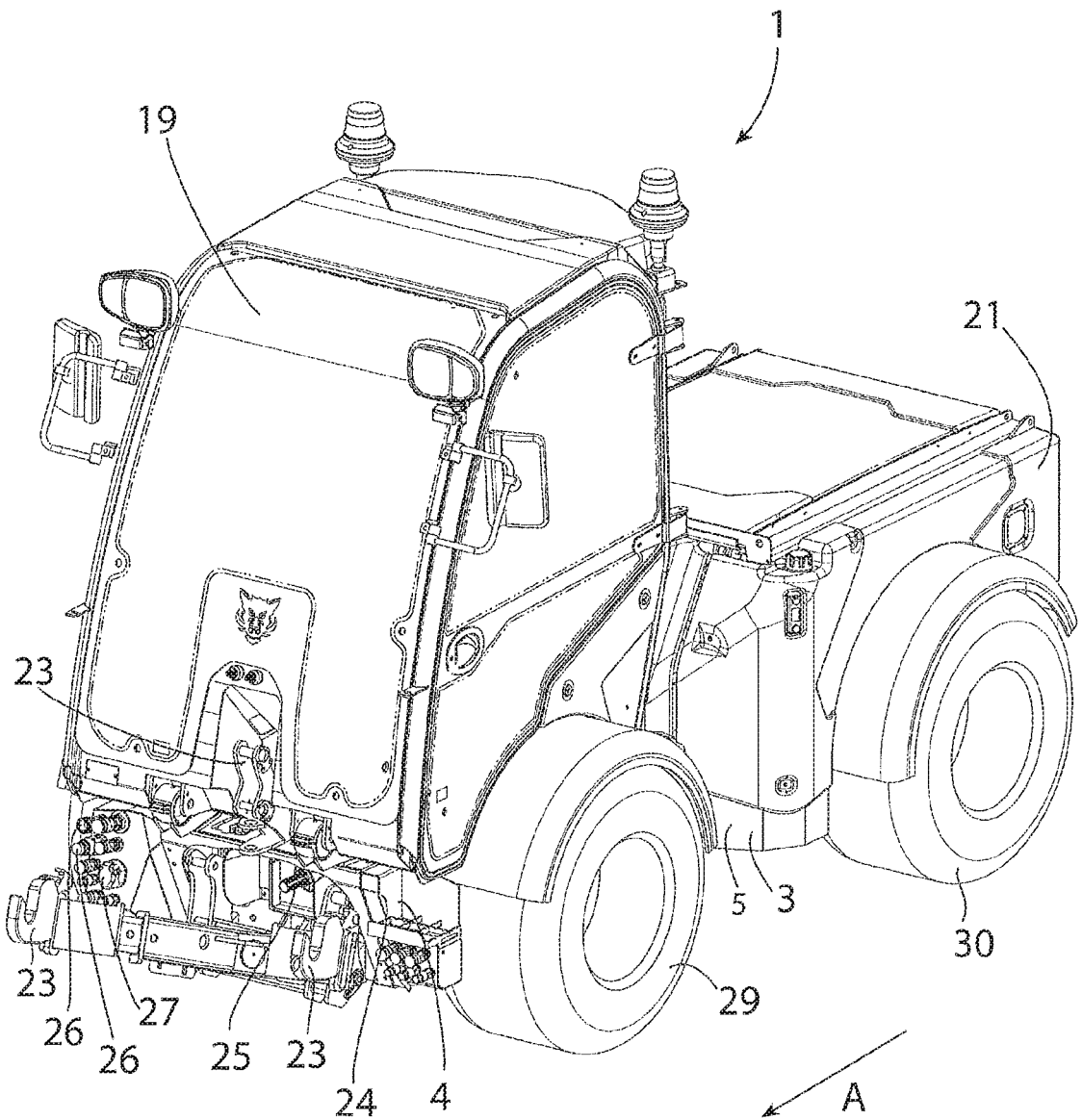

main forward pivot mountings (65). The main forward transverse pivot shafts (63) defines a main forward transverse pivot axis (59) about which the forward suspension unit (32) is pivotal relative to the forward chassis part (4). The forward suspension unit (32) comprises a pair of spaced apart trailing arms (35) which are joined by a torsion shaft (68) of tubular steel, which is rigidly connected to the trailing arms (35). The torsion shaft (68) defines a torsional axis (70), and permits limited upward and downward pivotal type torsional deflection of the trailing arms (35) relative to each other. The rearward suspension unit (33) is substantially similar to the forward suspension unit (32) and is coupled to the rearward chassis part (5) about a pair of main rearward transverse pivot shafts (87) in a similar manner as the forward suspension unit (32) is coupled to the forward chassis part (4).

26 Claims, 10 Drawing Sheets

(51) Int. Cl.
 *B60G 7/00* (2006.01)
 *B60K 7/00* (2006.01)
 *E02F 9/02* (2006.01)

(52) U.S. Cl.
 CPC .......... *B60K 7/0007* (2013.01); *B60K 7/0015* (2013.01); *E02F 9/02* (2013.01); *E02F 9/0808* (2013.01); *E02F 9/0841* (2013.01); *B60G 2200/22* (2013.01); *B60G 2200/422* (2013.01); *B60G 2202/136* (2013.01); *B60G 2202/1362* (2013.01); *B60G 2204/1226* (2013.01); *B60G 2204/18* (2013.01); *B60G 2204/182* (2013.01); *B60G 2206/012* (2013.01); *B60G 2206/722* (2013.01); *B60G 2300/082* (2013.01); *B60G 2300/09* (2013.01); *B60K 2007/0038* (2013.01); *B60K 2007/0092* (2013.01)

(58) Field of Classification Search
 CPC ...... B60G 2202/1362; B60G 2202/136; B60G 2204/182; B60G 2206/012; B60G 2200/22; B60G 2200/422; B60G 2204/1226; B60G 2206/722; B60G 2300/09; E02F 9/0808; E02F 9/0841; E02F 9/02; B60K 7/0007; B60K 7/0015; B60K 2007/0038; B60K 2007/0092
 See application file for complete search history.

(56) References Cited

U.S. PATENT DOCUMENTS

| | | | |
|---|---|---|---|
| 10,221,055 B2 * | 3/2019 | Hao | B66F 9/065 |
| 2006/0027992 A1 | 2/2006 | Bordini | |
| 2009/0272596 A1 * | 11/2009 | Thomson | B60K 7/0015 |
| | | | 180/305 |
| 2015/0135985 A1 * | 5/2015 | Brandstaetter | B61F 5/22 |
| | | | 105/199.2 |

FOREIGN PATENT DOCUMENTS

| | | |
|---|---|---|
| GB | 2 172 858 A | 10/1986 |
| GB | 2 389 085 A | 12/2003 |
| WO | 2007/019862 A1 | 2/2007 |

* cited by examiner

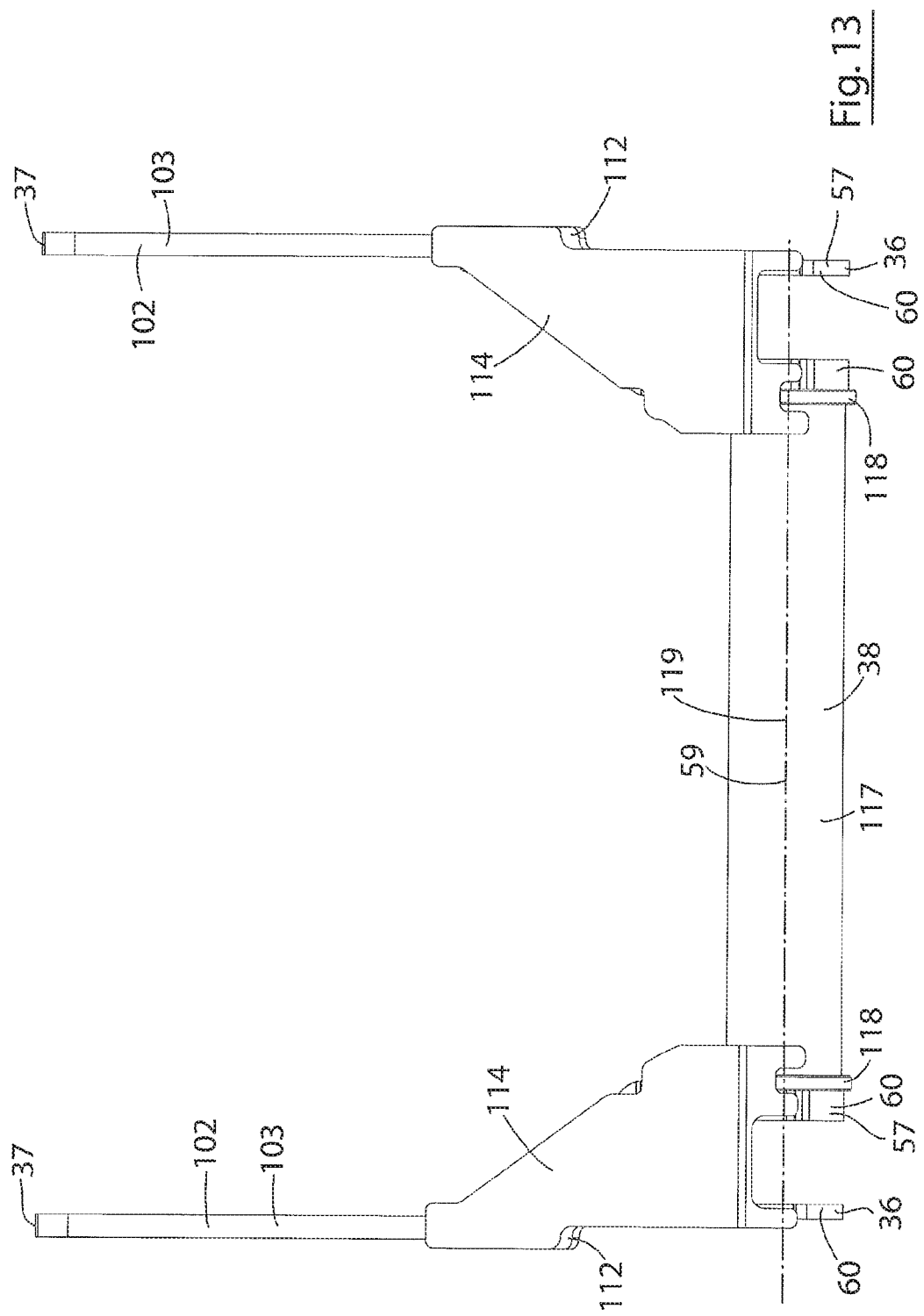

WHEELED WORK VEHICLE AND A SUSPENSION UNIT FOR A WHEELED WORK VEHICLE

CROSS REFERENCE TO RELATED APPLICATIONS

This application is a National Stage of International Application No. PCT/IE2016/000023, filed on Dec. 7, 2016, which claims priority from Irish Patent Application No. S2015/0428, filed on Dec. 7, 2015, the disclosures of which are incorporated by reference herein.

The present invention relates to a wheeled work vehicle and to a suspension unit for suspending a pair of ground engaging wheels from a chassis of a wheeled work vehicle.

Wheeled work vehicles are well known, and typically are adapted for receiving attachments mounted thereon, and in particular, mounted on the forward end thereof. Such attachments may include a mower for cutting crops or mowing a lawn, a hedge trimmer, an elongated transversely extending plough blade, an elongated cylindrical rotatably mounted brush, a sprayer for a herbicide, an insecticide or a fertiliser, a snow plough, a snow blower, and other such attachments. Typically, the attachments are mounted on a mounting system located adjacent the front of the vehicle, which may comprise a three-point linkage mounting or other suitable mounting system. A power take-off shaft may or may not be provided adjacent the front of the vehicle for powering the attachment. Additionally, hydraulic and electrical couplers are located towards the forward end of the vehicle for coupling an hydraulic and/or an electrical system of the attachment to the hydraulic system and electrical power supply of the vehicle for powering the attachment.

Needless to say, such work vehicles may be similarly configured at the rear thereof for receiving such attachments coupled to the rear of the vehicle. Such work vehicles may be provided with a one piece chassis with steerable front and/or rear wheels. Alternatively, such work vehicles may be provided with a two part chassis comprising a forward chassis part and a rearward chassis part, which are pivotally coupled together about a substantially vertically extending pivot axis for facilitating pivoting of the forward chassis part relative to the rearward chassis part for steering the work vehicle. Such work vehicles will be well known to those skilled in the art.

Typically, such work vehicles which comprise two part chassis are provided with a pair of spaced apart forward ground engaging wheels which are non-steerably mounted on the forward chassis part, and a pair of spaced apart rearward ground engaging wheels which are non-steerably mounted on the rearward chassis part. Typically, each forward ground engaging wheel is carried on a suspension unit which is coupled to the forward chassis part, and the suspension units of the respective forward ground engaging wheels are independent suspension units, so that the forward ground engaging wheels are suspended from the forward chassis part independently of each other. Similarly, the rearward ground engaging wheels are mounted on the rearward chassis part by similar type independent suspension units, which are independent of each other.

In general, such wheeled work vehicles with forward and rearward ground engaging wheels mounted on the forward and rearward chassis parts, respectively, by independent suspension units are adequate where the work vehicle is required to carry attachments the weight of which is relatively evenly transversely distributed across the width of the work vehicle. However, where such work vehicles are required to carry attachments where the majority of the weight of the attachment is disposed towards one side or the other of the work vehicle, such work vehicles with independent suspension are unsatisfactory. This, is due to the fact that because of the independent suspension and the pivotal connection of the forward and rearward chassis parts about a substantially vertically extending pivot axis, the forward part of the work vehicle which is carrying the attachment with the sidewardly off-set load tends to tilt downwardly on the side to which the load is off-set relative to the rearward part of the work vehicle. This problem is further amplified in work vehicles whereby the forward and rearward chassis parts are pivotally coupled together about a substantially vertically extending primary pivot axis which is defined by a lower primary pivoting mounting and an upper primary pivot mounting, and in which the upper primary pivot mounting is coupled to the forward chassis part by a link member through a secondary pivot mounting which defines a substantially vertically extending secondary pivot axis forwardly spaced apart from the primary pivot axis.

Such primary and secondary pivot mountings, in general, comprise swivel pivot mountings which permit pivotal tilting of the forward chassis part relative to the rearward chassis part about an imaginary horizontal pivot axis, in order to accommodate the vehicle as it passes over uneven ground. However, the fact that such work vehicles include four wheel independent suspension as well as the facility whereby the forward chassis part can tilt to one side relative to the rearward chassis part about a substantially horizontally extending imaginary pivot axis results in excessive downward tilting of the forward chassis part relative to the rearward chassis part on the side of the work vehicle to which the load of an attachment is off-set. This is undesirable and in extreme cases can result in a work vehicle toppling over on its side.

The present invention is directed towards providing a wheeled work vehicle which addresses this problem of known wheeled work vehicles and the invention is also directed towards providing a suspension unit for such a wheeled work vehicle.

According to the invention there is provided a suspension unit for a wheeled work vehicle, the suspension unit comprising a pair of spaced apart wheel carrying arms for carrying respective ground engaging wheels, a main mounting means defining a main transverse pivot axis and configured for pivotally connecting the suspension unit to a chassis of a wheeled work vehicle with the main transverse pivot axis extending transversely of the direction of normal forward motion of the work vehicle and with the wheel carrying arms extending in one of a generally rearward direction and a generally forward direction from the main transverse pivot axis, and an elongated connecting member extending substantially parallel to the main transverse pivot axis between the wheel carrying arms and connecting the wheel carrying arms for retaining the wheel carrying arms in the spaced apart disposition, the connecting member being one of located relatively closely to the main transverse pivot axis, located adjacent the main transverse pivot axis and located substantially coinciding with the main transverse pivot axis.

In one aspect of the invention the connecting member is rigidly connected to the wheel carrying arms.

In another aspect of the invention the connecting member comprises an elongated torsion shaft defining a torsional axis about which limited pivotal type deflection of the wheel carrying arms relative to each other is permitted.

Preferably, the limited pivotal type deflection of the wheel carrying arms relative to each other about the torsional axis is a function of the torsional rigidity of the torsion shaft.

Advantageously, the torsion shaft is connected to the wheel carrying arms with the torsional axis thereof extending substantially parallel to the main transverse pivot axis and being one of located relatively closely to the main transverse pivot axis, located adjacent the main transverse pivot axis and located substantially coinciding with the main transverse pivot axis. Preferably, the torsional axis substantially coincides with the main transverse pivot axis. Advantageously, the torsional axis coincides with the main transverse pivot axis.

In another aspect of the invention the connecting member comprises a hollow shaft. Preferably, the connecting member is of circular transverse cross-section. Advantageously, the connecting member is of steel.

In another aspect of the invention at least one coupling means is located on the suspension unit spaced apart from the main transverse pivot axis for coupling the suspension unit to a shock absorbing element configured for coupling between the suspension unit and the chassis of the wheeled work vehicle.

Preferably, the at least one coupling means is configured for adjustably coupling the suspension unit to the shock absorbing element for varying the minimum vertical spacing between distal ends of the respective wheel carrying arms and the chassis. Advantageously, the at least one coupling means comprises at least two individually selectable coupling points therein for coupling the suspension unit to the shock absorbing element. Preferably, the at least one coupling means comprises at least three individually selectable coupling points. Ideally, the at least one coupling means comprises at least four individually selectable coupling points.

In another aspect of the invention a pair of the coupling means are provided for coupling to respective corresponding shock absorbing elements. Preferably, each wheel carrying arm comprises one of the coupling means located thereon. Advantageously, each coupling means is located adjacent the distal end of the corresponding wheel carrying arms.

In one aspect of the invention the main mounting means is configured for pivotally coupling to a main pivot mounting located on the chassis of the wheeled work vehicle.

Preferably, a pair of the main mounting means are provided, the main mounting means being located adjacent the respective opposite ends of the connecting member for engaging corresponding ones of the main pivot mountings on the chassis. Advantageously, the main mounting means are located on the respective wheel carrying arms. Advantageously, the main mounting means are located adjacent the proximal ends of the respective wheel carrying arms.

In another aspect of the invention each main mounting means comprises at least one main mounting bracket having one of a main bore extending therethrough, and a main pivot shaft extending therefrom, the one of the main bore and the main pivot shaft defining the main transverse pivot axis.

In another aspect of the invention one of each main bore and each main pivot shaft is configured for pivotally engaging the main pivot mounting or the corresponding one of the pair of main pivot mountings on the chassis of the vehicle.

Preferably, each main mounting means comprises a corresponding one of the main pivot shafts extending from the corresponding main mounting bracket.

Advantageously, each main pivot shaft is configured for pivotally engaging a corresponding one of the pair of the main pivot mountings located on the chassis spaced apart from each other.

In another aspect of the invention each wheel carrying arm is configured for carrying a corresponding one of the ground engaging wheels. Preferably, each wheel carrying arm is configured for carrying the corresponding ground engaging wheel about a rotational axis spaced apart from and substantially parallel to the main transverse pivot axis. Advantageously, the wheel carrying arms are configured for carrying the corresponding ground engaging wheels with the rotational axes of the respective ground engaging wheels being equi-spaced apart from the main transverse pivot axis. Ideally, the rotational axis of each ground engaging wheel is located towards the distal end of the corresponding wheel carrying arm.

In one aspect of the invention the wheel carrying arms are configured as trailing arms.

In an alternative aspect of the invention the wheel carrying arms are configured as leading arms.

The invention also provides a wheeled work vehicle comprising a chassis, and at least one suspension unit according to the invention pivotally coupled to the chassis about the main transverse pivot axis with the main transverse pivot axis extending transversely of the direction of normal forward motion of the work vehicle, and with the wheel carrying arms extending in one of a generally rearward direction and a generally forward direction from the main transverse pivot axis, and each wheel carrying arm carrying one of a pair of ground engaging wheels with the rotational axes of the respective ground engaging wheels one of trailing and leading the main transverse pivot axis.

In one aspect of the invention the at least one suspension unit is coupled to the chassis for carrying a pair of spaced apart forward ground engaging wheels of the work vehicle.

In an alternative aspect of the invention the at least one suspension unit is coupled to the chassis for carrying a pair of spaced apart rearward ground engaging wheels of the work vehicle.

Preferably, a pair of the suspension units are provided for carrying the respective forward and rearward ground engaging wheels of the work vehicle.

In one aspect of the invention the chassis comprises at least one main pivot mounting for pivotally coupling the at least one suspension unit to the chassis.

Preferably, the main pivot mounting for each suspension unit defines the main transverse pivot axis of the suspension unit.

In another aspect of the invention at least one shock absorbing element is coupled between the at least one suspension unit and the chassis.

In one aspect of the invention the chassis comprises a forward chassis part and a rearward chassis part, the rearward chassis part being pivotally coupled to the forward chassis part about a substantially vertically extending primary pivot axis for steering of the vehicle.

In another aspect of the invention the at least one suspension unit is coupled to the forward chassis part.

In an alternative aspect of the invention the at least one suspension unit is coupled to the rearward chassis part.

In a further aspect of the invention one of the suspension units is coupled to the forward chassis part, and one of the suspension units is coupled to the rearward chassis part.

In one aspect of the invention a lower primary pivot mounting and an upper primary pivot mounting spaced apart above the lower primary pivot mounting pivotally couple the forward and rearward chassis parts about the substantially vertically extending primary pivot axis for steering of the work vehicle. Preferably, the lower primary pivot mounting is directly coupled to the forward and rearward chassis parts. Advantageously, the upper primary pivot mounting is directly coupled to one of the forward and rearward chassis parts, and is coupled to the other one of the forward and rearward chassis parts through a link member.

In one aspect of the invention the link member is coupled directly to the upper primary pivot mounting and is coupled to the said other one of the forward and rearward chassis parts through a secondary pivot mounting about a substantially vertically extending secondary pivot axis spaced apart in a direction generally forwardly/rearwardly from the primary pivot axis.

Preferably, the lower and upper primary pivot mountings and the secondary pivot mounting are configured to permit limited pivoting of the forward chassis part and the rearward chassis part relative to each other about substantially horizontally extending imaginary pivot axis, for permitting limited relative tilting movement between the forward and rearward chassis parts about an imaginary substantially horizontally extending imaginary pivot axis to accommodate the wheeled work vehicle over uneven ground.

Additionally the invention provides a wheeled work vehicle comprising a chassis, and at least one suspension unit coupled to the chassis and carrying a pair of spaced apart ground engaging wheels thereon, the suspension unit comprising a pair of spaced apart wheel carrying arms carrying the respective ground engaging wheels, a main mounting means defining a main transverse pivot axis pivotally connected to the chassis with the main transverse pivot axis extending transversely of the direction of normal forward motion of the work vehicle and with the wheel carrying arms extending in one of a generally rearward direction and a generally forward direction from the main transverse pivot axis, and an elongated connecting member extending substantially parallel to the main transverse pivot axis between the wheel carrying arms and connecting the wheel carrying arms for retaining the wheel carrying arms in the spaced apart disposition, the connecting member being one of located relatively closely to the main transverse pivot axis, located adjacent the main transverse pivot axis and located substantially coinciding with the main transverse pivot axis.

In one aspect of the invention the connecting member of the at least one suspension unit is rigidly connected to the wheel carrying arms thereof.

In another aspect of the invention the connecting member of the at least one suspension unit comprises an elongated torsion shaft defining a torsional axis about which limited pivotal type deflection of the wheel carrying arms relative to each other is permitted. Preferably, the limited pivotal type deflection of the wheel carrying arms relative to each other about the torsional axis defined by the torsion shaft is a function of the torsional rigidity of the torsion shaft.

In another aspect of the invention the torsion shaft is connected to the wheel carrying arms with the torsional axis thereof extending substantially parallel to the main transverse pivot axis and being one of located relatively closely to the main transverse pivot axis, located adjacent the main transverse pivot axis and located substantially coinciding with the main transverse pivot axis.

Preferably, the torsional axis defined by the torsion shaft substantially coincides with the main transverse pivot axis. Advantageously, the torsional axis defined by the torsion shaft coincides with the main transverse pivot axis.

In one aspect of the invention the connecting member comprises a hollow shaft. Preferably, the connecting member is of circular transverse cross-section. Advantageously, the connecting member is of steel.

Preferably, the connecting member is connected to the wheel carrying arms adjacent the proximal ends of the wheel carrying arms.

In one aspect of the invention at least one main pivot mounting is located on the chassis and defines the main transverse pivot axis, the main pivot mounting pivotally engaging the main mounting means of the at least one suspension unit for pivotally coupling the suspension unit to the chassis.

In another aspect of the invention a pair of the main pivot mountings are located spaced apart transversely on the chassis defining the main transverse pivot axis, the main pivot mountings pivotally engaging the main mounting means about the main transverse pivot axis.

In another aspect of the invention a pair of the main mounting means are provided spaced apart transversely on the at least one suspension unit for pivotally engaging the respective main pivot mountings.

In a further aspect of the invention each main mounting means of the at least one suspension unit comprises at least one main mounting bracket having one of a main bore extending therethrough, and a main pivot shaft extending therefrom, the one of the main bore and the main pivot shaft defining the main transverse pivot axis and being engageable with the corresponding main pivot mounting.

Preferably, each main mounting means comprises a corresponding one of the main pivot shafts, the main pivot shafts extending from the corresponding main mounting bracket.

Advantageously, the main pivot shafts define the main transverse pivot axis and are pivotally carried on the corresponding ones of the main pivot mountings.

Advantageously, the main mounting means are located adjacent the proximal ends of the wheel carrying arms.

In another aspect of the invention at least one shock absorbing element is coupled between the at least one suspension unit and the chassis. Preferably, an adjusting means is provided for adjustably coupling the at least one suspension unit to the chassis through the shock absorbing element for varying the minimum vertical spacing between the distal ends of the wheel carrying arms and the chassis.

In one aspect of the invention at least one coupling means is located on the suspension unit spaced apart from the main transverse pivot axis for coupling the suspension unit to the shock absorbing element.

Preferably, the at least one coupling means is configured as the adjusting means for adjustably coupling the suspension unit to the shock absorbing element for varying the minimum vertical spacing between the distal ends of the respective wheel carrying arms and the chassis.

In one aspect of the invention the at least one coupling means comprises at least two individually selectable coupling points therein for coupling the suspension unit to the shock absorbing element. Preferably, the coupling means comprises at least three individually selectable coupling points. Advantageously, the coupling means comprises at least four individually selectable coupling points.

Preferably, a pair of shock absorbing elements are coupled between the suspension unit and the chassis.

Advantageously, the shock absorbing elements are located on respective opposite sides of the chassis, and are coupled to the respective wheel carrying arms by the corresponding ones of the coupling means. Preferably, the coupling means are located adjacent the distal ends of the respective wheel carrying arms.

In another aspect of the invention each wheel carrying arm rotatably carries a corresponding one of the ground engaging wheels about a rotational axis spaced apart from the main transverse pivot axis. Preferably, the wheel carrying arms carry the corresponding ground engaging wheels with the rotational axes of the respective ground engaging wheels equi-spaced apart from the main transverse pivot axis. Advantageously, the rotational axis of each ground engaging wheel is located towards the distal end of the corresponding wheel carrying arm.

Preferably, a drive motor is mounted on each wheel carrying arm for driving the corresponding ground engaging wheel rotatably carried thereon.

In one aspect of the invention the wheel carrying arms are configured as trailing arms.

In an alternative aspect of the invention the wheel carrying arms are configured as leading arms.

In another aspect of the invention the wheel carrying arms are spaced apart by the connecting member to accommodate the chassis therebetween.

In another aspect of the invention the wheel carrying arms are spaced apart by the connecting member a distance for carrying the drive motors on inner sides of the respective wheel carrying arms with the chassis located between the respective drive motor.

In a further aspect of the invention the at least one suspension unit is mounted on the chassis towards a forward end thereof and carries a forward pair of the ground engaging wheels of the wheeled work vehicle.

In an alternative aspect of the invention the at least one suspension unit is coupled to the chassis towards a rearward end thereof and carries a rearward pair of the ground engaging wheels of the wheeled work vehicle.

In another aspect of the invention two suspension units are provided, one of the suspension units comprising a forward suspension unit coupled to the chassis towards the forward ends thereof carrying a forward pair of the ground engaging wheels, and a rearward suspension unit coupled to the chassis towards a rearward end thereof carrying a rearward pair of the ground engaging wheels.

In another aspect of the invention the chassis comprises a forward chassis part and a rearward chassis part, the rearward chassis part being pivotally coupled to the forward chassis part about a substantially vertically extending primary pivot axis for steering of the vehicle.

In a further aspect of the invention the forward and rearward chassis parts are pivotally coupled about the primary pivot axis by a lower primary pivot mounting and an upper primary pivot mounting spaced apart above the lower primary pivot mounting together defining the primary pivot axis. Preferably, the lower primary pivot mounting is directly coupled to the forward and rearward chassis parts. Advantageously, the upper primary pivot mounting is coupled directly to the one of the forward and rearward chassis parts, and is coupled to the other one of the forward and rearward chassis parts through a link member.

In another aspect of the invention the link member is coupled directly to the upper primary pivot mounting, and the link member is coupled to the said other one of the forward and rearward chassis parts through a secondary pivot mounting about a substantially vertically extending secondary pivot axis spaced apart from the primary pivot axis.

Preferably, the primary and the secondary pivot axes are spaced apart in a generally forwardly rearwardly direction relative to the normal forward direction of movement of the wheeled work vehicle.

Advantageously, the lower and upper primary pivot mountings and the secondary pivot mounting define respective substantially horizontally extending swivel axes for permitting limited relative tilting of one of the forward and rearward chassis parts relative to the other about an imaginary horizontal axis to accommodate the vehicle over uneven ground.

In one aspect of the invention one of the suspension units is mounted on the forward chassis part.

In another aspect of the invention one of the suspension units is mounted on the rearward chassis part.

In a further aspect of the invention one of the suspension units is mounted on the forward chassis part, and another one of the suspension units is mounted on the rearward chassis part.

The advantages of the invention are many. A particularly important advantage of the invention is that, even in two part chassis wheeled work vehicles, whereby tilting of the forward chassis part relative to the rearward chassis part about a substantially horizontal imaginary pivot axis is permitted, the wheeled work vehicle is capable of carrying attachments whereby the weight of the attachment is off-set to one side of the work vehicle with minimum downward tilting of the forward chassis part relative to the rearward chassis part on the side to which the weight of the attachment is off-set. This significantly improves the cornering stability of the wheeled work vehicle, as well as the straight line and steering stability of the work vehicle, and leads to improved driver safety and comfort. Additionally, there is less danger of the work vehicle toppling over on its side when carrying an attachment in which the weight of the attachment is off-set to one side of the work vehicle. This advantage is achieved by virtue of the fact that the suspension unit according to the invention provides a substantially rigid suspension for the ground engaging wheels, thereby, limiting downward tilting of the forward chassis part, while at the same time permitting limited torsional deflection of one of the wheel carrying arms relative to the other wheel carrying arm, and in turn relative upward or downward deflection of one of the ground engaging wheels relative to the other ground engaging wheel. This limited torsional deflection of the wheel carrying arms relative to each other improves the driver's comfort and safety, and thereby provides a comfortable ride.

Figure 2:
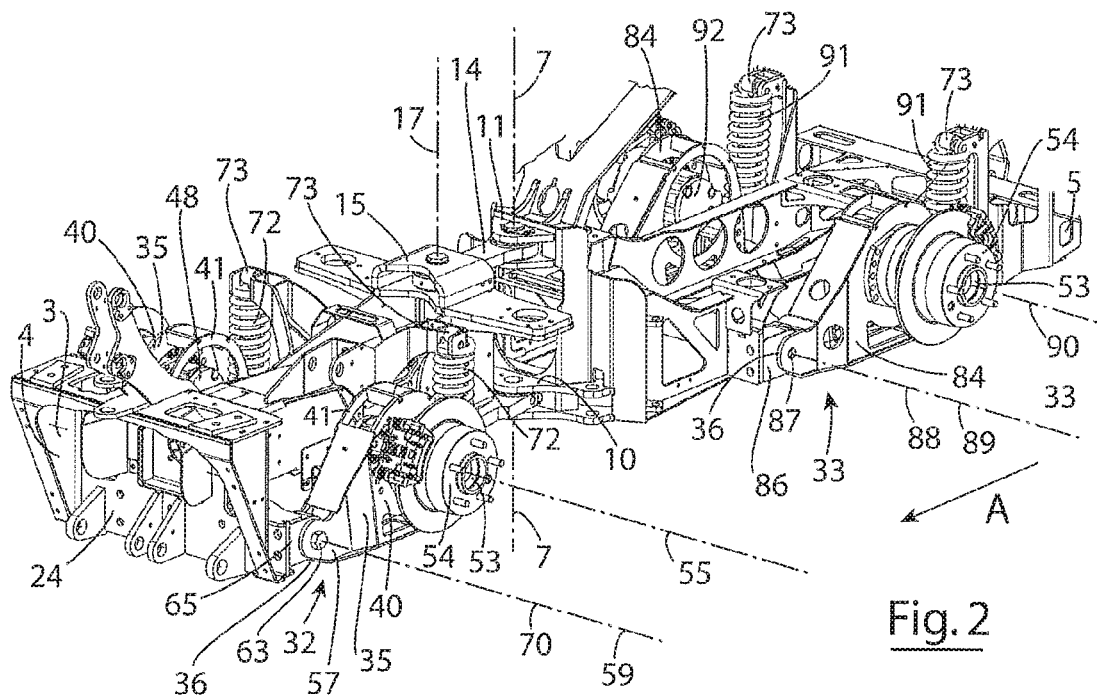
Figure 3:
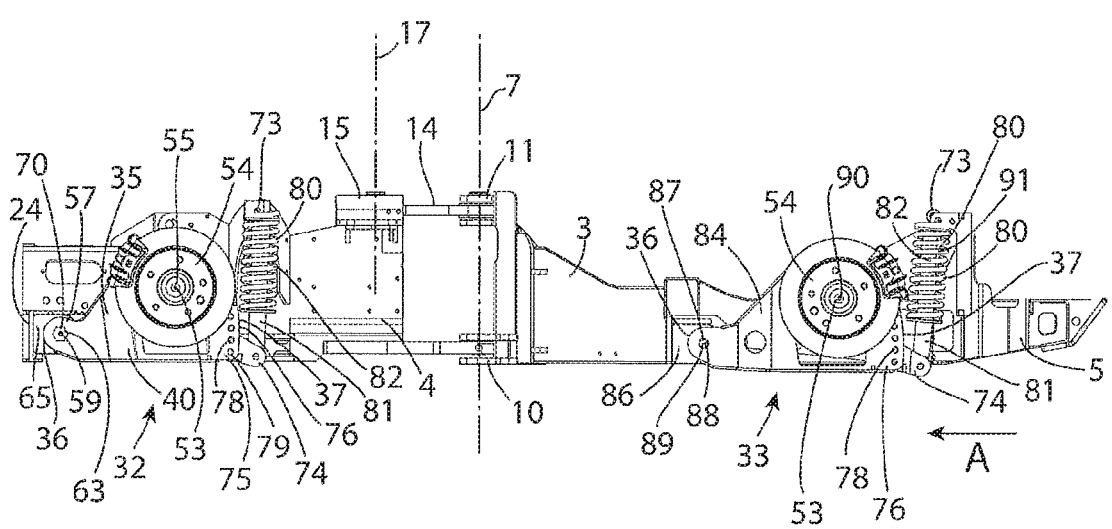
Figure 4:
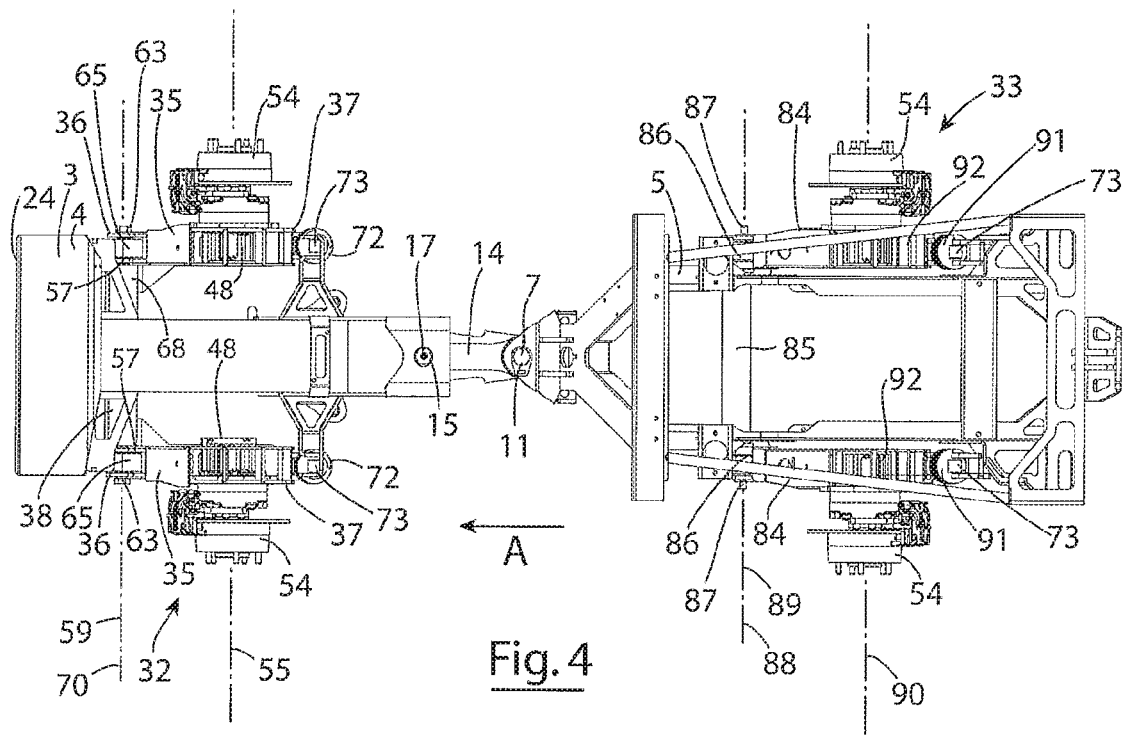
Figure 7:
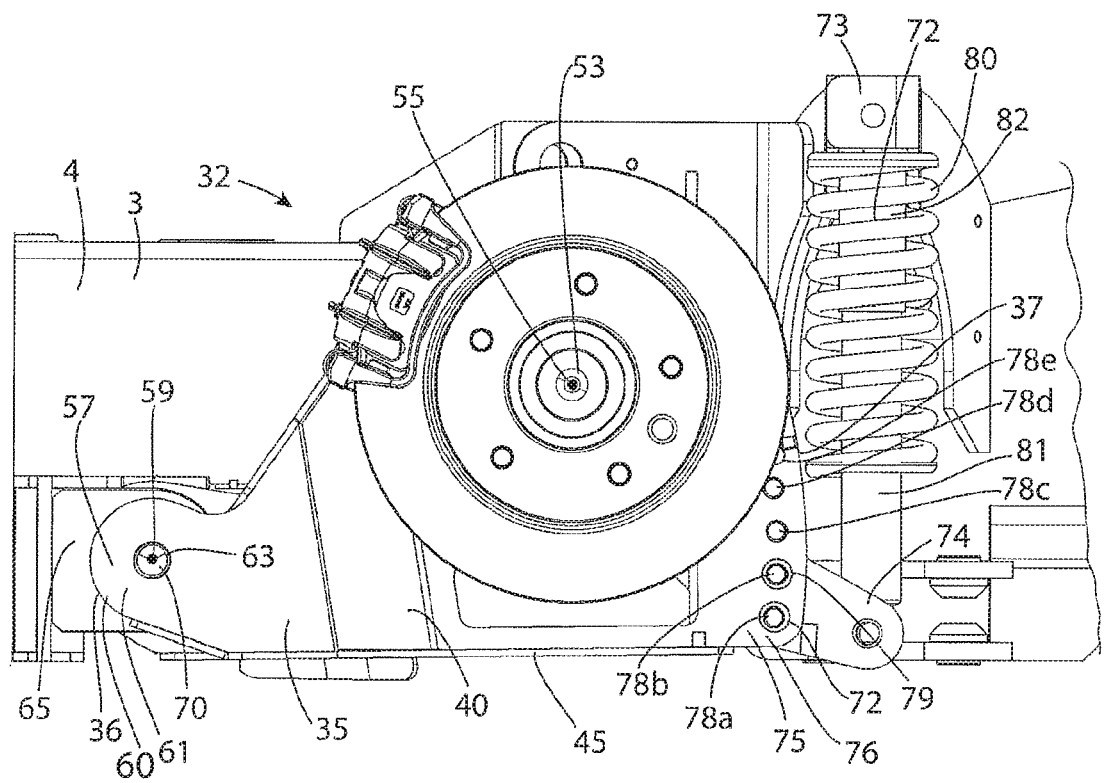
Figure 5:
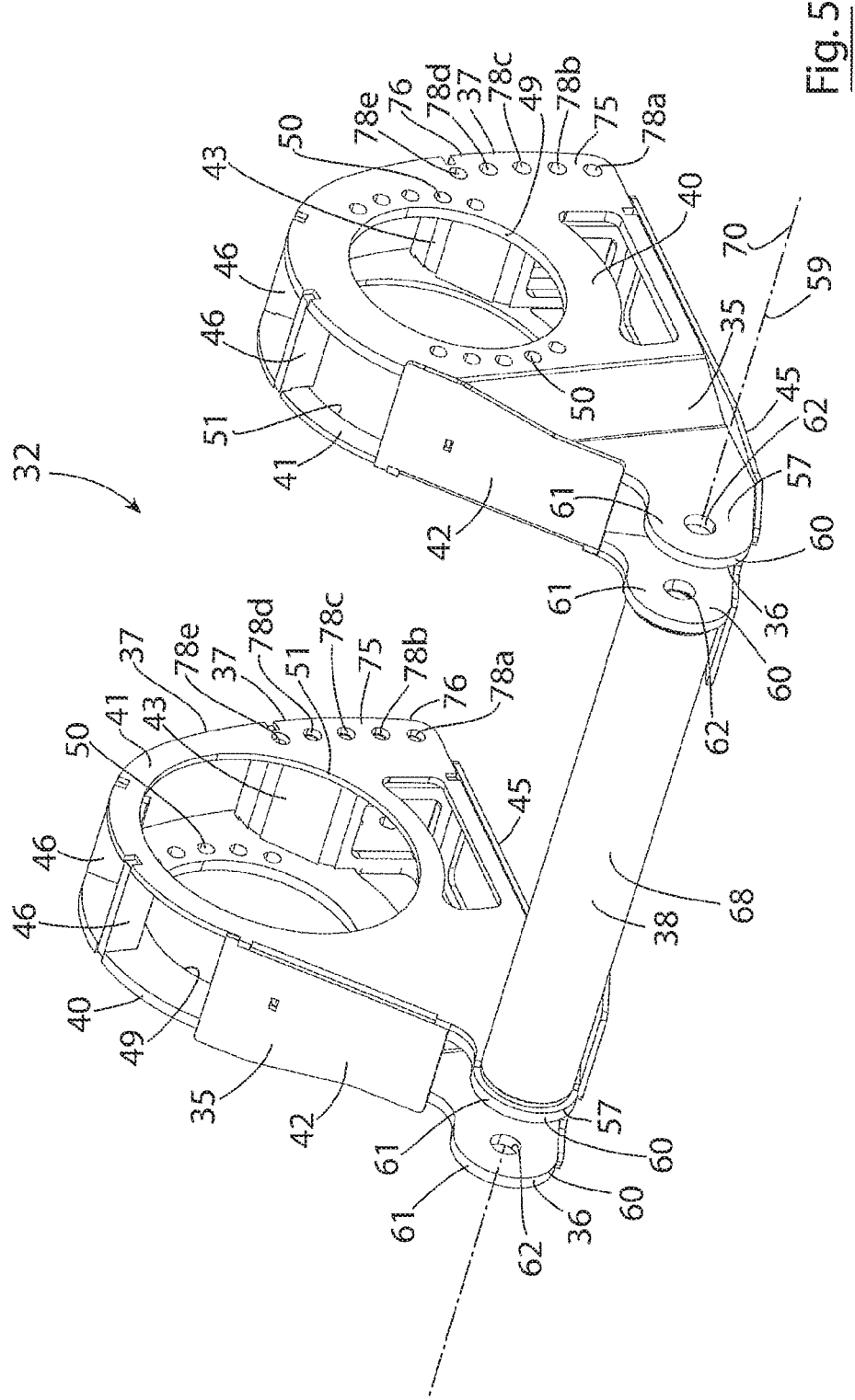
Figure 6:
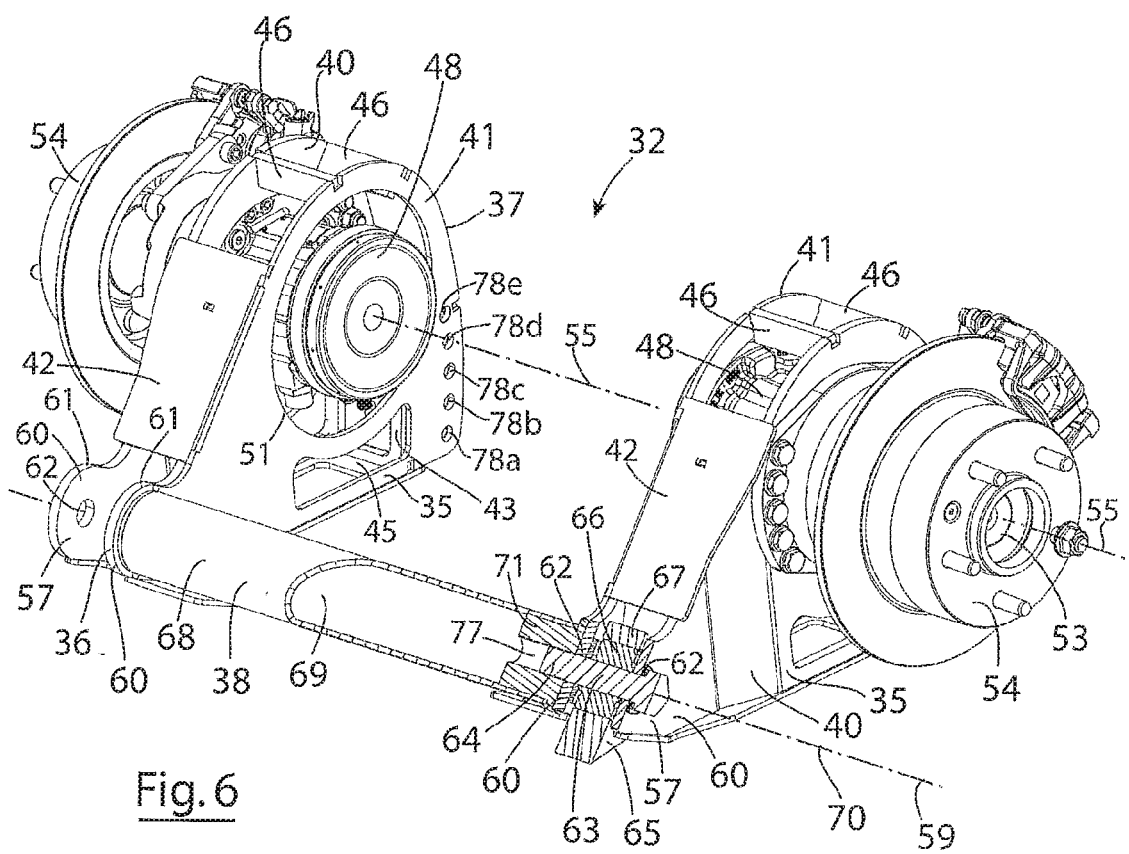
Figure 12:
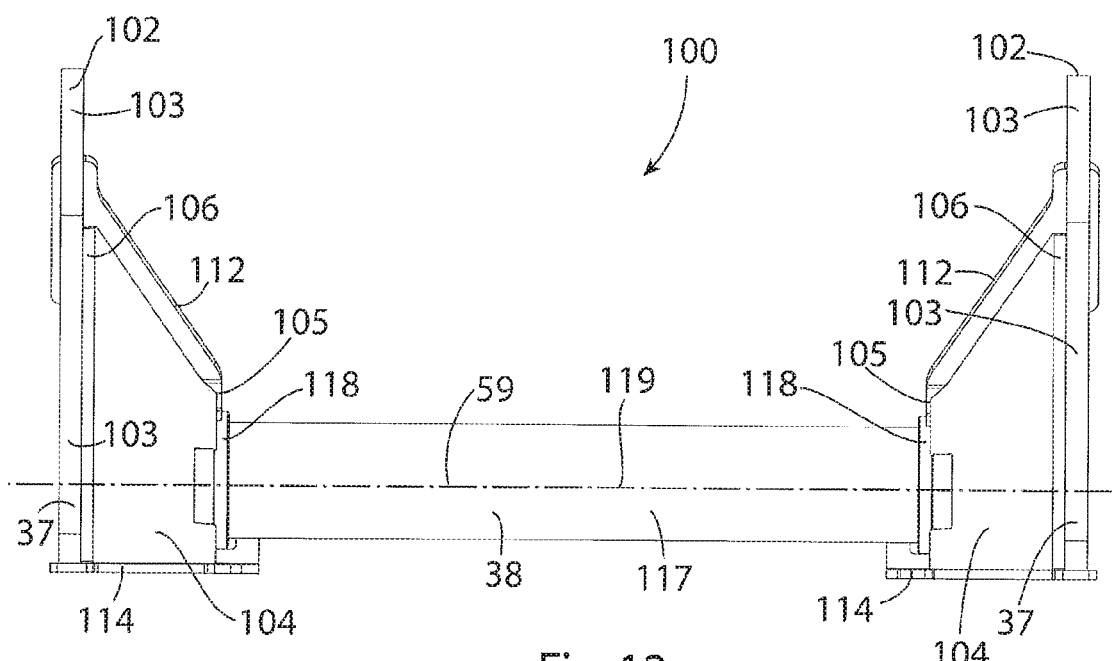
Figure 8:
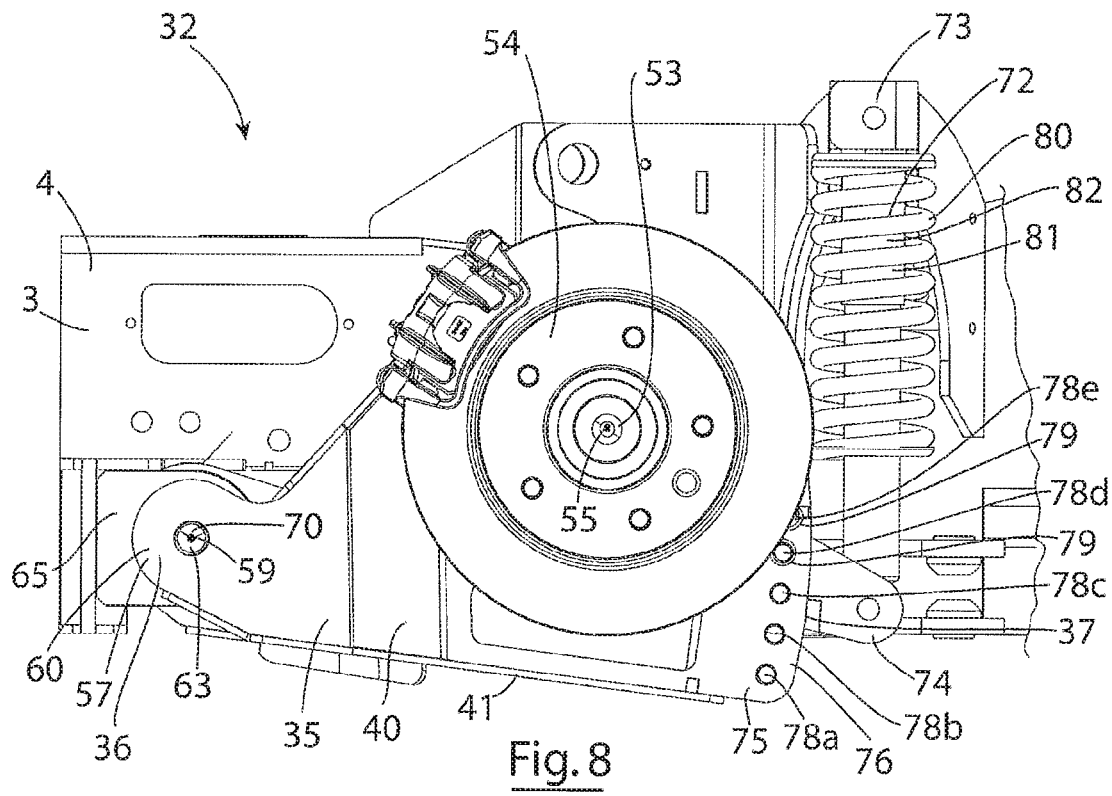
Figure 9:
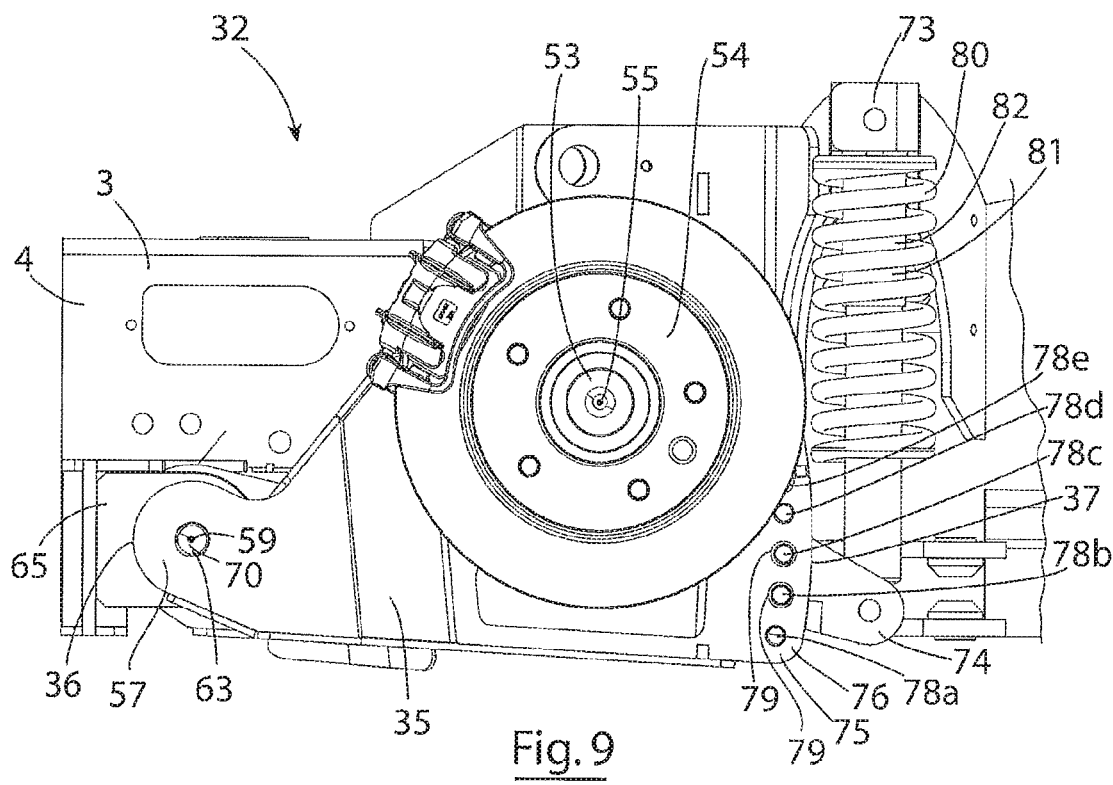
Figure 10:
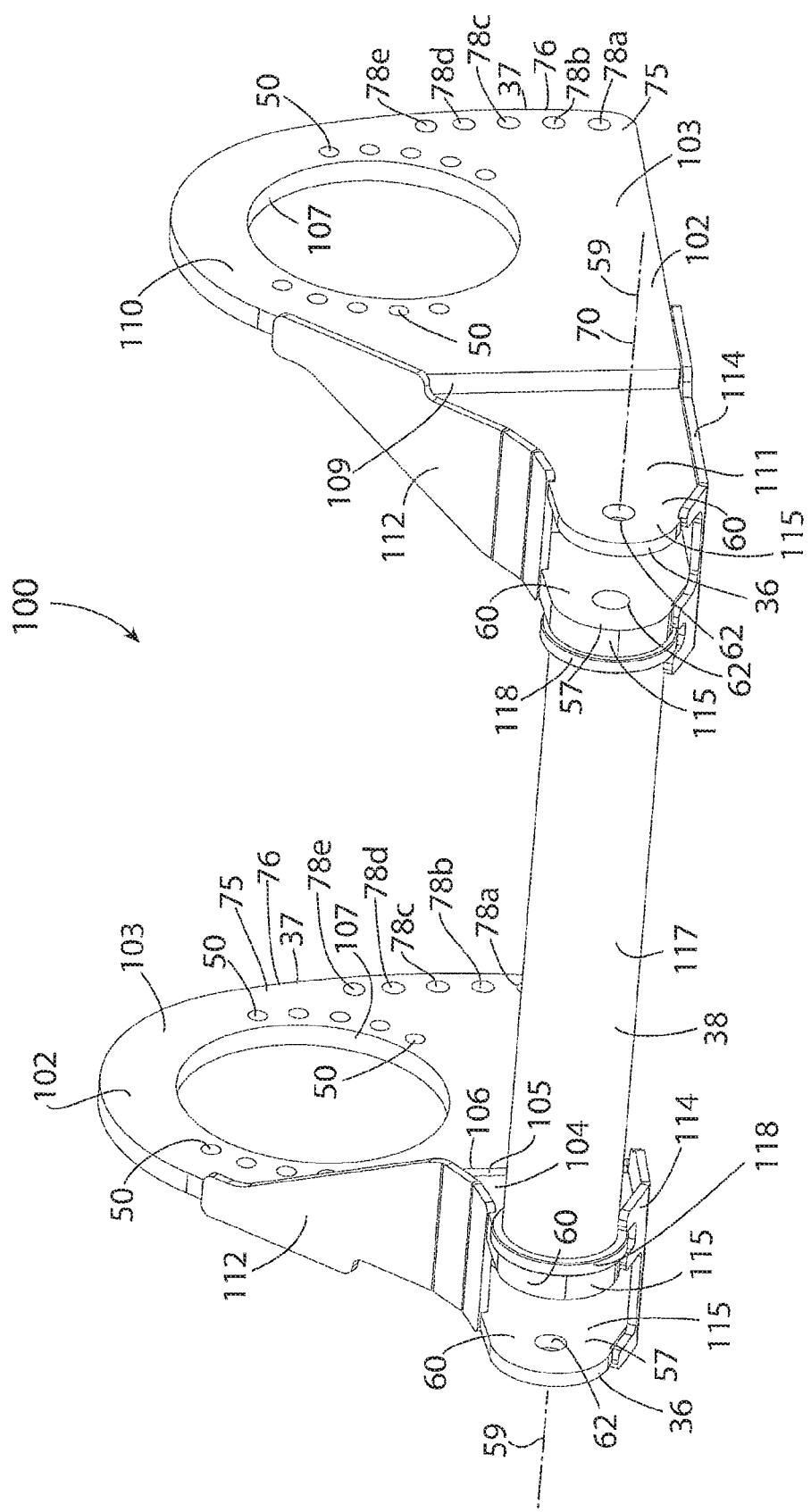
Figure 11:
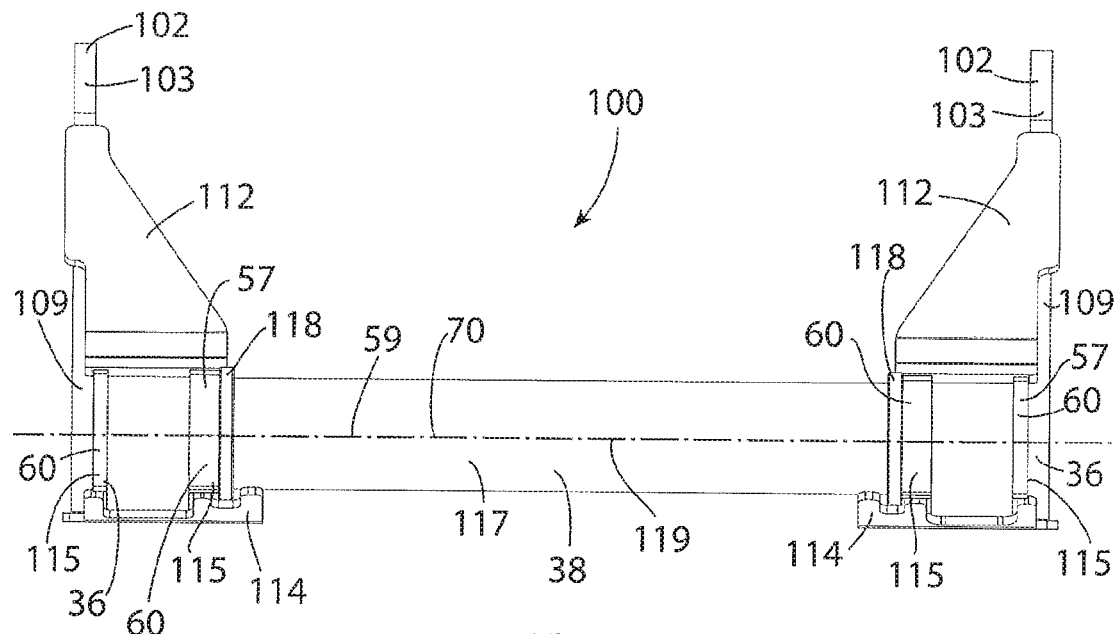
Figure 15:
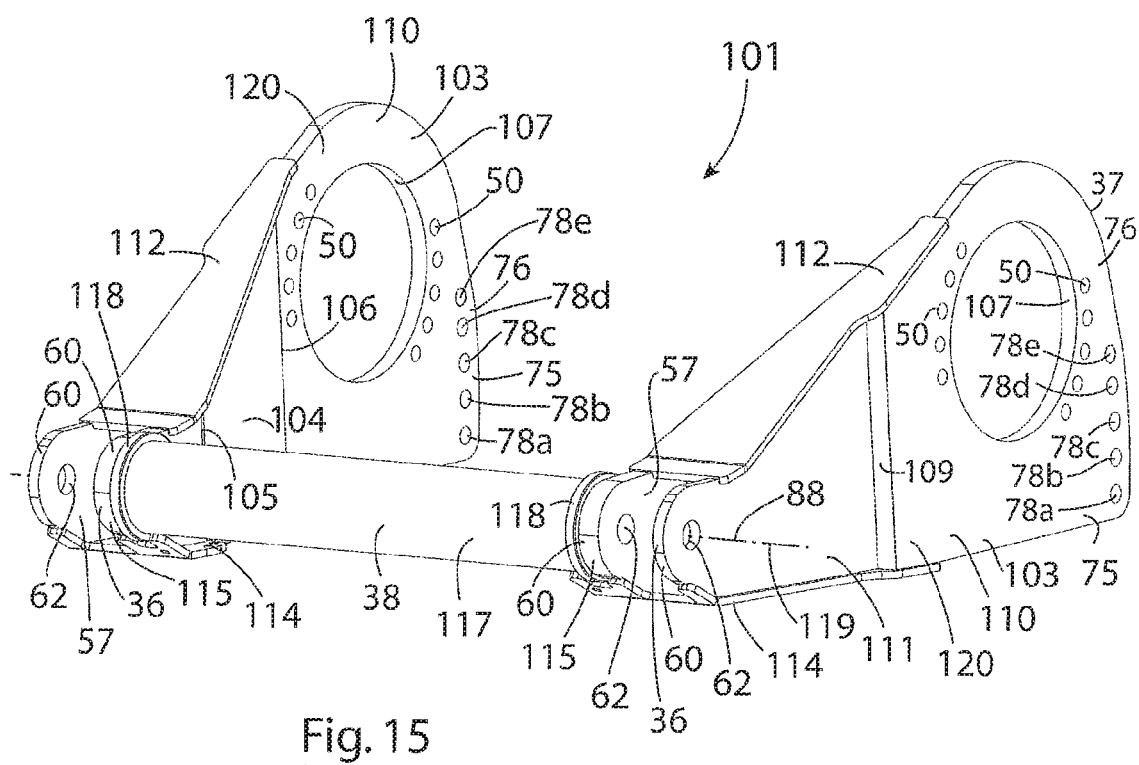
Figure 14:
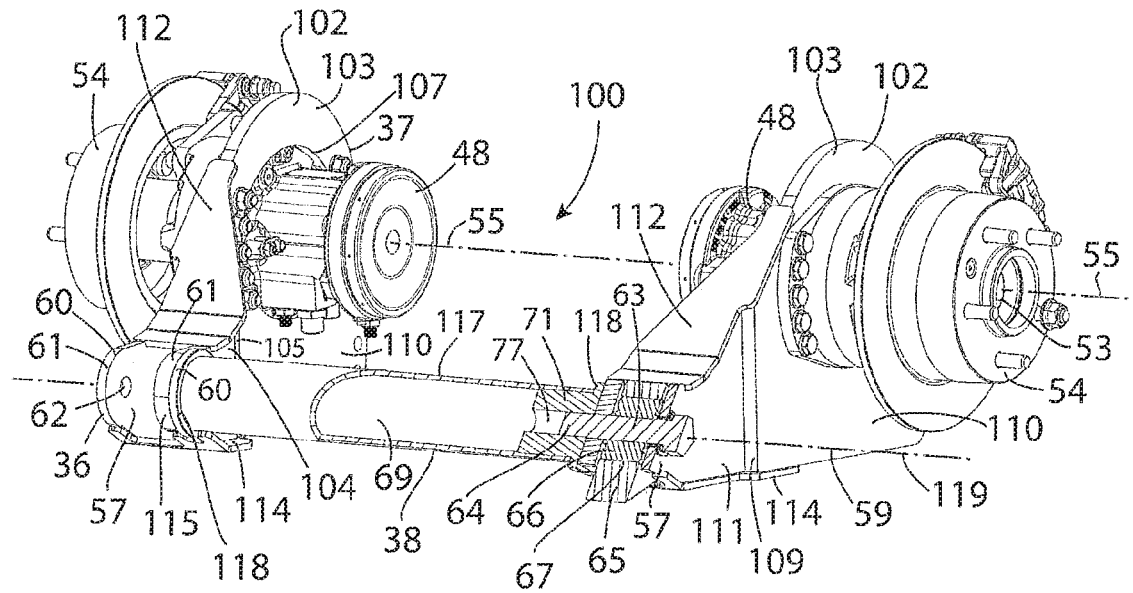
Figure 16:
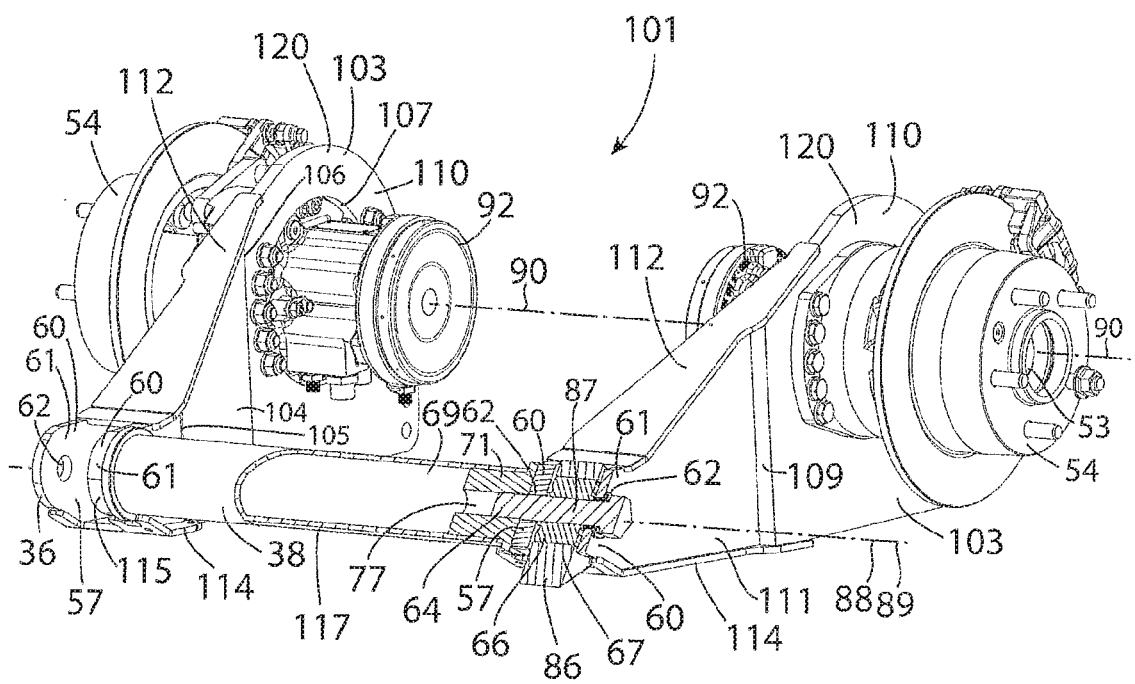

The invention will be more clearly understood from the following description of some preferred embodiments thereof, which are given by way of example only, with reference to the accompanying drawings, in which:

FIG. 1 is a perspective view of a wheeled work vehicle according to the invention, FIG. 2 is a perspective view of a portion of the wheeled work vehicle of FIG. 1, FIG. 3 is a side elevational view of the portion of FIG. 2 of the wheeled work vehicle of FIG. 1, FIG. 4 is a top plan view of the portion of FIG. 2 of the wheeled work vehicle of FIG. 1, FIG. 5 is a perspective view of a suspension unit also according to the invention of the wheeled work vehicle of FIG. 1, FIG. 6 is a perspective view of the suspension unit of FIG. 5 illustrating the suspension unit with additional components of the suspension unit of FIG. 5 mounted thereon, FIG. 7 is a side elevational view of a portion of the wheeled work vehicle of FIG. 1 with the suspension unit of FIG. 5, FIG. 8 is a view similar to FIG. 7 of the portion of FIG. 7 of the wheeled work vehicle of FIG. 1 with the suspension unit of FIG. 5, FIG. 9 is a view similar to FIG. 7 of the portion of FIG. 7 of the wheeled work vehicle of FIG. 1 with the suspension unit of FIG. 5, FIG. 10 is a perspective view of a suspension unit according to another embodiment of the invention, FIG. 11 is a front end elevational view of the suspension unit of FIG. 10, FIG. 12 is a rear end elevational view of the suspension unit of FIG. 10, FIG. 13 is an underneath plan view of the suspension unit of FIG. 10, FIG. 14 is another perspective view of the suspension unit of FIG. 10 with additional components of the suspension unit of FIG. 10 mounted thereon, FIG. 15 is a perspective view of another suspension unit also according to the invention, and FIG. 16 is a perspective view of the suspension unit of FIG. 15 with additional components of the suspension unit of FIG. 15 mounted thereon.

Referring to the drawings, and initially to FIGS. 1 to 9 thereof, there is illustrated a wheeled work vehicle according to the invention, indicated generally by the reference numeral 1. The wheeled work vehicle 1 comprises a two part chassis 3 having a forward chassis part 4 and a rearward chassis part 5, which are pivotally connected about a substantially vertically extending central primary pivot axis 7 for facilitating steering of the wheeled work vehicle 1. A pair of hydraulically powered steering rams (not shown) are coupled to the forward chassis part 4 and the rearward chassis part 5 on respective opposite sides of the primary pivot axis 7 for steering of the wheeled work vehicle 1. The steering of such wheeled work vehicles as the wheeled work vehicle 1 will be well known to those skilled in the art.

A lower primary pivot mounting 10 and an upper primary pivot mounting 11 spaced apart above the lower primary pivot mounting 10 define the substantially vertically extending primary pivot axis 7 and pivotally couple the forward and rearward chassis parts 4 and 5 together. The lower primary pivot mounting 10 is directly coupled to the rearward chassis part 5 and to the forward chassis part 4. The upper primary pivot mounting 11 is directly coupled to the rearward chassis part 5 and is coupled to the forward chassis part 4 by an upper link member 14, which in turn is pivotally coupled to the forward chassis part 4 by a secondary pivot mounting 15 which defines a substantially vertically extending secondary pivot axis 17.

The lower and upper primary pivot mountings 10 and 11 and the secondary pivot mounting 15 are swivelable pivot mountings, which as well as defining the primary pivot axis 7 and the secondary pivot axis 17, respectively, also define substantially horizontally extending pivot axes about which limited pivotal movement of the forward and rearward chassis parts 4 and 5 about the lower and upper primary pivot mountings 10 and 11 and the secondary pivot mounting 15 is permitted. This limited pivotal movement of the forward chassis part 4 relative to the rearward chassis part 5 about the horizontally extending pivot axes facilitates limited tilting movement of the forward chassis part 4 from side to side relative to the rearward chassis part 5 about an imaginary substantially horizontally extending imaginary pivot axis as the wheeled work vehicle 1 traverses over uneven ground. The pivotal mounting of the forward and rearward chassis parts 4 and 5 about such a primary pivot axis and a secondary pivot axis will be well known to those skilled in the art, and further description should not be required.

A driver's cab 19 is mounted on the forward chassis part 4, and an engine (not shown) for powering the wheeled work vehicle 1 is mounted on the rearward chassis part 5 and is housed within a housing 21 mounted on the rearward chassis part 5. A suitable mounting arrangement, which in this embodiment of the invention comprises a three-point linkage mounting 23 is located on the forward chassis part 4 adjacent a front end 24 of the wheeled work vehicle 1 for carrying attachments on the wheeled work vehicle 1. Such attachments as described above may comprise a mower, a hedge trimmer, an elongated transversely mounted plough blade, an elongated rotatably mounted cylindrical brush, a spraying bar for spraying herbicide, insecticide, fertiliser and the like, a snow blower, and will be well known to those skilled in the art.

A power take-off shaft 25 extending from the wheeled work vehicle 1 adjacent the front end 24 thereof is provided for powering the attachment. Hydraulic couplers 26 and an electrical power supply coupler 27 are provided on the front end 24 of the wheeled work vehicle 1 for providing hydraulic power supplies to the attachment, and for providing hydraulic control of the operation of the attachment, and also for providing an electrical power supply to the attachment as required. The power take-off shaft 25 typically is driven through a mechanical transmission means (not shown) by the engine, or alternatively, the power take-off shaft 25 may be powered by an hydraulic motor which in turn would be powered by an hydraulic power supply provided by an hydraulic pump powered by the engine. Hydraulic power provided by pressurised hydraulic fluid is provided from one or more hydraulic pumps powered by the engine and delivered to the attachment through the hydraulic couplers 26. Electrical power which is generated by the engine is provided to the electrical power supply coupler 27. Drive from the engine to the power take-off shaft 25, and the supply of hydraulic fluid and electrical power through the hydraulic couplers 26 and the electrical power supply coupler 27, respectively, is controlled by switches and/or joystick controlled switch or joystick controlled valves, none of which are shown, but are located in the driver's cab 19 for operation by the driver of the wheeled work vehicle 1 and the attachment attached to the work vehicle 1. This aspect of the wheeled work vehicle 1 will be known to and understood by those skilled in the art.

A pair of spaced apart forward ground engaging wheels 29 are mounted on the forward chassis part 4, and a pair of spaced apart rearward ground engaging wheels 30 are mounted on the rearward chassis part 5 by respective suspension units also according to the invention, namely, a forward suspension unit indicated generally by the reference numeral 32, which carries the forward ground engaging wheels 29 and the rearward suspension unit indicated generally by the reference numeral 33, which carries the rearward ground engaging wheels 30. The forward and rearward suspension units 32 and 33 are substantially similar to each other, and accordingly, for convenience the forward suspension unit 32 will be described in detail, and the differences between the rearward suspension unit 33 and the forward suspension unit 32 will be described subsequently.

Referring in particular to FIGS. 5 and 6, the forward suspension unit 32 comprises a pair of spaced apart wheel carrying arms 35 which in this embodiment of the invention are configured as trailing arms 35 for carrying respective ones of the forward ground engaging wheels 29, and each trailing arm 35 extend between a proximal end, which in this embodiment of the invention is a leading end 36 and a distal end, which in this embodiment of the invention is a trailing end 37. A forward elongated connecting member 38 extends between the trailing arms 35 and is rigidly connected to the respective trailing arms 35 adjacent the leading ends 36 for retaining the trailing arms 35 spaced apart from each other, with the trailing arms 35 extending rearwardly from the connecting member 38 relative to the direction of normal forward motion of the wheeled work vehicle 1. The direction of normal forward motion of the wheeled work vehicle 1 is indicated by the arrow A. It will, however, be appreciated that instead of the forward suspension unit 32 being configured with the wheel carrying arms configured as trailing arms extending rearwardly from the connecting member 38, the forward suspension unit 32 could be configured with the wheel carrying arms configured as leading arms extending forwardly from the connecting member 38. In this case the proximal end of the wheel carrying arms 35 would be the trailing end and the distal end would be the leading end thereof.

In this embodiment of the invention each trailing arm 35 comprises an outer plate 40 and an inner plate 41 spaced apart from the outer plate 40, both of which are of steel plate material. A forward reinforcing plate 42, a rearward reinforcing plate 43 and a lower reinforcing plate 45, all of steel plate material extend between and join the outer and inner plates 40 and 41 of each trailing arm 35. Upper reinforcing members 46 of steel also extending between the outer and inner plates 40 and 41 further reinforce the trailing arms 35. The reinforcing plates 42, 43 and 45, as well as the reinforcing members 46 are welded to the outer and inner plates 40 and 41.

Each trailing arm 35 is configured to carry an hydraulically powered motor 48 for driving the corresponding one of the forward ground engaging wheels 29. A circular opening 49 in the outer plate 40 accommodates a portion of the hydraulic motor 48 for centring the hydraulic motor 48 in the outer plate 40, while screw accommodating bores 50 extending through the outer plate 40 adjacent the opening 49 accommodates screws for securing the hydraulic motor 48 to the outer plate 40. A corresponding circular opening 51 in the inner plate 41 accommodates the hydraulic motor 40 through the inner plate 41. A drive shaft 53 extending from the hydraulic motor 48 of each trailing arm 35 carries a corresponding hub 54 to which the corresponding forward ground engaging wheel 29 is secured. The drive shafts 53 of the hydraulic motors 48 define respective forward rotational axes 55 about which the forward ground engaging wheels 29 rotate.

A main mounting means comprising a main mounting bracket 57 is formed at the leading end 36 of each trailing arm 35 for pivotally coupling the forward suspension unit 32 about a main forward transverse pivot axis 59 which extends transversely of the direction of normal forward motion of the wheeled work vehicle 1. Each main mounting bracket 57 comprises a pair of spaced apart mounting brackets 60 which are formed by leading portions 61 of the respective outer and inner plates 40 and 41. The mounting brackets 60 of each main mounting bracket 57 are each provided with a bore 62 for accommodating a corresponding one of a pair of main forward transverse pivot shafts 63. The main forward transverse pivot shafts 63 define the main forward transverse pivot axis 59. A pair of spaced apart main forward pivot mountings 65 are mounted on the forward chassis part 4 on respective opposite sides thereof for pivotally carrying the corresponding one of the main forward transverse pivot shafts 63, so that the forward suspension unit 32 is pivotal upwardly and downwardly about the main forward transverse pivot axis 59. A rubber bushing 66 is located in a bore 67 extending through each main forward pivot mounting 65 for in turn pivotally carrying the corresponding one of the main forward transverse pivot shafts 63 in the corresponding main forward pivot mounting 65.

Turning now to the forward connecting member 38, in this embodiment of the invention the forward connecting member 38 comprises a torsion shaft 68 comprising an elongated tubular member of steel of circular transverse cross-section having an elongated bore 69 also of circular transverse cross-section extending therethrough. The torsion shaft 68 is rigidly connected at its opposite ends to the mounting brackets 60 formed by the leading portions 61 of the inner plates 41 of the respective trailing arms 35 by welding. The torsion shaft 68 of the forward suspension unit 32 defines a transversely extending torsional axis 70, which coincides with the central longitudinal geometrical axis of the torsion shaft 68, and which also coincides with the main forward transverse pivot axis 59. The torsion shaft 68 is configured to permit limited upwards and downward pivotal type torsional deflection of the trailing arms 35 relative to each other about the torsional axis 70. The degree of upward and downward pivotal type torsional deflection of the trailing arms 35 relative to each other about the torsional axis 70 of the torsion shaft 68, which is permitted, is a function of the difference in the loads applied to the respective forward ground engaging wheels 29 through the forward suspension unit 32 and the torsional rigidity of the torsion shaft 68.

In this embodiment of the invention the hydraulic motors 48 are mounted on the trailing arms 35 of the forward suspension unit 32, so that the forward rotational pivot axes 55 defined by the drive shafts 53 are equi-spaced apart from the main forward transverse pivot axis 59, and thus, coincide with each other, except when the trailing arms 35 deflect relative to each other about the torsional axis 70.

In this embodiment of the invention the torsion shaft 68, which forms the connecting member 38 which connects the trailing arms 35 of the forward suspension unit 32, is of length so that the spacing between the trailing arms 35, and in turn the spacing between the hydraulic motors 48 which are carried on the trailing arms 35, is such that the forward chassis part 4 is accommodated between the trailing arms 35 and the corresponding hydraulic motors 48, thereby maximising the compactness of the wheeled work vehicle 1, and minimising the height of the centre of gravity of the wheeled work vehicle above the ground.

Although, in this embodiment of the invention the torsional axis 70 of the torsion shaft 68 of the forward suspension unit 32 coincides with the main forward transverse pivot axis 59, it is envisaged that in certain cases, the torsional axis 70 of the torsion shaft 68 of the forward suspension unit 32 may not necessarily coincide with the main forward transverse pivot axis 59. Although, in general, it is believed that it is desirable that the torsional axis 70 and the main forward transverse pivot axis 59 should be located relatively closely to each other, either upwardly, downwardly, forwardly or rearwardly relative to the main forward transverse pivot axis 59. However, in general, it is envisaged that the torsional axis 70 of the torsion shaft 68 of the forward suspension unit 32 should extend parallel to the main forward transverse pivot axis 59, and preferably, should be adjacent or substantially coincide with the main forward transverse pivot axis 59.

A pair of plug elements 71 are located in the bore 69 of the torsion shaft 68 at the respective opposite ends of the torsion shaft 68, and are rigidly welded to the torsion shaft 68. A threaded bore 77 is formed in each plug element 71 for receiving and engaging a threaded end 64 of the corresponding one of the main forward transverse pivot shafts 63 for securing the corresponding main transverse pivot shaft 63 in the torsion shaft 68, and in turn in the forward suspension unit 32. The threaded bores 77 define a common pivot axis, which coincides with the main forward transverse pivot axis 59.

A pair of forward shock absorbing elements 72 suspend the trailing arms 35 adjacent the respective trailing ends 37 thereof from the forward chassis part 4. The shock absorbing elements 72 are located on the respective opposite sides of the forward chassis part 4, and are connected between the trailing ends 37 of the respective trailing arms 35, and the forward chassis part 4, rearwardly of the main forward transverse pivot axis 59 for damping pivotal movement of the forward suspension unit 32 about the main forward transverse pivot axis 59, and in turn for damping upward and downward movement of the forward ground engaging wheels 29.

Each shock absorbing element 72 is pivotally coupled to the forward chassis part 4 by a corresponding upper pivotal connector 73 rearwardly of the main forward transverse pivot axis 59. Each shock absorbing element 72 is pivotally coupled to the trailing end 37 of the corresponding trailing arm 35 by a lower pivotal connector 74. A coupling means, which in this embodiment of the invention provides for adjustable coupling of each shock absorbing element 72 to the trailing end 37 of the corresponding trailing arm 35, comprises coupling brackets 75 formed by a trailing portion 76 of the outer plate 40 and the inner plate 41 of the corresponding trailing arm 35. Each coupling bracket 75 comprises five bores 78, which form an adjusting means, and are selectable in pairs for accommodating a pair of screws 79 for securing the corresponding lower pivotal connector 74 to the trailing arm 35 at four selectable points, for in turn setting the minimum vertical spacing between the trailing ends 37 of the trailing arms 35 and the locations on the forward chassis part 4 to which the upper pivotal connectors 73 are secured.

By selecting the pair of bores 78a and 78b of the coupling brackets 75 for accommodating the screws 79 for in turn coupling the lower pivotal connectors 74 of the corresponding shock absorbing elements 72 to the trailing arms 35, the minimum vertical spacing between the trailing ends 37 of the trailing arms 35 and the locations at which the upper pivotal connectors 73 are secured to the forward chassis part 4 is minimised. By selecting the pair of bores 78d and 78e of the coupling brackets 75 for accommodating the screws 79 for in turn coupling the lower pivotal connectors 74 of the corresponding shock absorbing elements 72 to the trailing arms 35, the minimum vertical spacing between the trailing ends 37 of the trailing arms 35 and the locations at which the upper pivotal connectors 73 are secured to the forward chassis part 4 is maximised, see FIG. 8. By selecting the pairs of bores 78b and 78c or the pairs of bores 78c and 78d of the coupling brackets 75 for accommodating the screws 79 for coupling the lower pivotal connectors 74 of the corresponding shock absorbing elements 72 to the coupling brackets 75, two other settings of the minimum vertical spacing between the trailing ends 37 of the trailing arms 35 and the locations at which the upper pivotal connectors 73 are secured to the forward chassis part 4 are selectable.

In general, the bores 78d and 78e of the coupling brackets 75 are selected for coupling the trailing arms 35 to the corresponding shock absorbing elements 72 when it is desired to increase the height of the forward chassis part 4 of the wheeled work vehicle 1 to its maximum height above the ground, and also when it is desired to fit relatively large diameter forward ground engaging wheels 29 to the wheeled work vehicle 1. The pairs of bores 78a and 78b of the coupling brackets 75 for coupling the trailing arms 35 to the shock absorbing elements 72 are selected when it is desired to have the centre of gravity of the wheeled work vehicle 1 at its lowest possible spacing above the ground, and also, when forward ground engaging wheels of relatively small diameter are suitable for the wheeled work vehicle 1. The pairs of the bores 78b and 78c or 78c and 78d of the coupling brackets 75 are selected for coupling the trailing arms 35 to the corresponding shock absorbing elements 72 when it is desired to fit forward ground engaging wheels 29 of medium diameter to the wheeled work vehicle 1.

Each shock absorbing element 72 comprises a compression spring 80 acting between the respective upper and lower pivotal connectors 73 and 74, and a pneumatic damper (not shown) which extends between the upper and lower pivotal connectors 73 and 74 within the compression spring 80, and within inner and outer telescoping dust covers 81 and 82 which are located within the compression spring 80.

Turning now to the rearward suspension unit 33, as mentioned above, the rearward suspension unit 33 is substantially similar to the forward suspension unit 32, and similar components are identified by the same reference numerals. The rearward suspension unit 33 comprises a pair of spaced apart wheel carrying arms, which in this embodiment of the invention are also configured as trailing arms 84. The trailing arms 84 are substantially identical to the trailing arms 35 of the forward suspension unit 32, with the exception that the trailing arms 84 are slightly longer from their respective leading ends 36 to their respective trailing ends 37.

The trailing arms 84 are joined by a connecting member, which in this embodiment of the invention is also provided by a torsion shaft 85 similar to the torsion shaft 68 of the forward suspension unit 32. A pair of main rearward pivot mountings 86, which are similar to the forward pivot mountings 65 are mounted on the rearward chassis part 5 on respective opposite sides thereof and pivotally carry corresponding ones of a pair of main rearward transverse pivot shafts 87 of the rearward suspension unit 33. The main rearward transverse pivot shafts 87 are similar to the main forward transverse pivot shafts 63, and define a main rearward transverse pivot axis 88 extending transversely of the direction of normal forward motion of the wheeled work vehicle 1 about which the rearward suspension unit 33 is pivotal, in a similar manner as the forward suspension unit 32 is pivotal about the main forward transverse pivot axis 59. The rearward suspension unit 33 is coupled to the main rearward transverse pivot shafts 87, in a similar manner as the forward suspension unit 32 is coupled to the main forward transverse pivot shafts 63, by a pair of main mounting means provided by main mounting brackets 57, which are similar to the main mounting brackets 57 of the forward suspension unit 32. The main rearward transverse pivot shafts 87 are pivotally carried in respective rubber bushings 66 located in the main rearward pivot mountings 86 in a similar manner as the main forward transverse pivot shafts 63 are pivotally carried in the rubber bushings 66 in the main forward pivot mountings 65. Plug elements 71 located in the bore 69 of the torsion shaft 85 at respective opposite ends thereof engage and secure the main rearward transverse pivot shafts 87 in the torsion shaft 85, and in turn in the rearward suspension unit 33, in a similar manner as the main forward transverse pivot shafts 63 are secured in the forward suspension unit 32.

The torsion shaft 85 of the rearward suspension unit 33 defines a torsional axis 89 about which limited upward and downward pivotal type torsional deflection of the trailing arms 84 relative to each other is permitted in a similar manner as limited upward and downward pivotal type torsional deflection of the trailing arms 35 of the forward suspension unit 32 relative to each other is permitted as discussed above. In this embodiment of the invention the torsional axis 89 coincides with the main rearward transverse pivot axis 88, although, as discussed with reference to the forward suspension unit 32, while it is preferable, it is not essential that the torsional axis 89 need coincide with the main rearward transverse pivot axis 88. The torsional axis 89 may be located adjacent or relatively close to the main rearward transverse pivot axis 88 and parallel thereto.

Hydraulic motors 92 are carried on the respective trailing arms 84 of the rearward suspension unit 33 for driving the rearward ground engaging wheels 30 about respective rearward rotational axes 90, in a similar manner as the hydraulic motors 48 are carried in the trailing arms 35 of the forward suspension unit 32. The spacing between the rearward rotational axes 90 of the rearward ground engaging wheels 30 and the main rearward transverse pivot axis 88 is greater in the rearward suspension units 33 than the corresponding spacing between the forward rotational axes 55 of the forward ground engaging wheels 29 and the main forward transverse pivot axis 59 of the forward suspension unit 32. In this embodiment of the invention the rearward rotational axes 90 are equi-spaced apart from the main rearward transverse pivot axis 88, and coincide with each other, except when the trailing arms 84 deflect relative to each other about the torsional axis 89.

Rearward shock absorbing elements 91, similar to the forward shock absorbing elements 92, are located on respective opposite sides of the rearward chassis part 5, and are connected between the rearward chassis part 5 and the trailing ends 37 of the respective trailing arms 84 of the rearward suspension unit 33 in a similar manner as the shock absorbing elements 72 are connected between the forward chassis part 4 and the trailing arms 35 of the forward suspension unit 32. Coupling brackets 75 similar to the coupling brackets 75 of the trailing arms 35 of the forward suspension unit 32 are formed by trailing portions 76 of the outer plates 40 and the inner plates 41 of the respective trailing arms 84 of the rearward suspension unit 33 for facilitating adjustable coupling of the shock absorbing elements 91 to the trailing arms 84 of the rearward suspension unit 33 in a similar manner as described above with reference to the forward suspension unit 32.

The torsion shaft 85 which forms the rearward connecting member connecting the trailing arms 84 of the rearward suspension unit 33 is of length so that the spacing between the inner plate 41 of the trailing arms 84 as well as the spacing between the hydraulic motors 92 is such as to accommodate the rearward chassis part 5 between the trailing arms 84 and also between the hydraulic motors 92. Additionally, in this embodiment of the invention a lower portion of the engine (not shown) is contained within the rearward chassis part 5, and accordingly, the portion of the engine contained within the rearward chassis part 5 is also accommodated between the trailing arms 84 and also between the hydraulic motors 92 of the rearward suspension unit 33.

In this embodiment of the invention the forward and rearward ground engaging wheels 29 and 30 are driven independently of each other by the hydraulic motors 48 and 92, respectively, from an hydraulic power supply provided by an hydraulic pump (not shown), which is powered by the engine (also not shown). The hydraulic motors 48 and 92 are located in the trailing arms 35 and in the trailing arms 84 of the forward and rearward suspension units 32 and 33, respectively, so that the rotational axes 55 and the rotational axes 90 of the drive shafts 53 of the respective hydraulic motors 48 and 92 are located towards the respective trailing ends 37 of the trailing arms 35 and 84 of the forward and rearward suspension units 32 and 33, respectively, and are spaced apart rearwardly from the corresponding one of the main forward transverse pivot axis 59 and the main rearward transverse pivot axis 88.

In use, as the wheeled work vehicle 1 is driven over ground, the forward and rearward suspension units 32 and 33 pivot about the corresponding forward and rearward main transverse pivot axes 59 and 88 to accommodate bumps and uneven surfaces of the terrain over which the wheeled work vehicle 1 is driven.

Additionally, the trailing arms 35 of the forward suspension unit 32 are permitted the limited upward and downward pivotal type torsional deflection relative to each other about the torsional axis 70 in response to the difference in loadings on the respective forward ground engaging wheels 29. Similarly, the trailing arms 84 of the rearward suspension unit 33 are also permitted the limited upward and downward pivotal type torsional deflection relative to each other about the torsional axis 89 of the rearward suspension unit 33 in response to a difference in the loadings on the respective rearward ground engaging wheels 30.

The advantages of the wheeled work vehicle 1 and the forward and rearward suspension units 32 and 33 which couple the forward and rearward ground engaging wheels 29 and 30 to the forward and rearward chassis parts 4 and 5 of the wheeled work vehicle 1 are many by virtue of the fact that the trailing arms 35 and 84 of the forward and rearward suspension units 32 and 33, respectively, are rigidly connected to the corresponding forward and rearward torsion shafts 68 and 85 of the respective forward and rearward suspension units 32 and 33, the trailing arms 35 of the forward suspension unit 32 must pivot about the main forward transverse pivot axis 59 in unison, and similarly, the trailing arms 84 of the rearward suspension unit 33 must likewise pivot in unison about the main rearward transverse pivot axis 88. Thus, in the event of an attachment comprising a load which is off-set to one side of the wheeled work vehicle 1, there is no danger of the wheeled work vehicle 1 tilting excessively to that side, as would otherwise occur if the trailing arms 35 of the forward suspension unit 32 were independently pivotal about the main forward transverse pivot axis 59, and the trailing arms 84 of the rearward suspension unit 33 were independently pivotal about the main rearward transverse pivot axis 88.

Additionally, by virtue of the fact that limited upward and downward pivotal type torsional deflection of the trailing arms 35 relative to each other of the forward suspension unit 32, and limited upward and downward pivotal type torsional deflection of the trailing arms 84 relative to each other of the rearward suspension unit 33 is permitted about the respective torsional axes 70 and 89, the combination of this torsional deflection and the pivotal movement of the forward suspension unit 32 about the main forward transverse pivot axis 59, and the pivotal movement of the rearward suspension unit 33 about the main rearward transverse pivot axis 88, significantly improves the cornering stability as well as the straight line and steering stability of the wheeled work vehicle 1 when the wheeled work vehicle 1 is carrying a load which is off-set to one or other side of the wheeled work vehicle 1, and also significantly improves driver's comfort and safety.

Referring now to FIGS. 10 to 16 a forward suspension unit according to another embodiment of the invention indicated generally by the reference numeral 100, and a rearward suspension unit also according to the invention indicated generally by the reference numeral 101, for use in the wheeled work vehicle 1, are illustrated. The forward and rearward suspension units 100 and 101 are substantially similar to the forward and rearward suspension units 32 and 33 described in the wheeled work vehicle 1 with reference to FIGS. 1 to 9, and similar components are identified by the same reference numerals.

Turning initially to the forward suspension unit 100, and referring to FIGS. 10 to 14, the main difference between the forward suspension unit 100 and the forward suspension unit 32 of the wheeled work vehicle 1 is in the construction of the wheel carrying arms, which in this embodiment of the invention are also configured as trailing arms 102. In this embodiment of the invention the trailing arms 102 each comprise an outer plate 103 of steel plate material which extends from the leading end 36 to the trailing end 37 of each trailing arm 102. An inner plate 104 of steel plate material extends rearwardly from the leading end 36 of each trailing arm 102 and is bent at 105 and converges inwardly therefrom towards the outer plate 103, and engages and is welded to the outer plate 103 at 106 just forwardly of an opening 107 in the outer plate 103 which accommodates the corresponding forward hydraulic motor 48. In this embodiment of the invention the outer plates 103 are double bent at 109, so that the spacing between rearward portions 110 of the outer plates 103 of the forward suspension unit 100 is greater than the spacing between forward portions 111 of the outer plates 103 of the forward suspension unit 100 to ensure that the forward chassis part 4 is accommodated between the trailing arms 102 and the respective hydraulic motors 48 of the trailing arms 102 in order to permit free pivotal movement of the trailing arms 102 on respective opposite sides of the forward chassis part 4 as the forward suspension unit 100 pivots about the main forward transverse pivot axis 59.

An upper reinforcing plate 112 of steel plate material and a lower reinforcing plate 114, also of steel plate material join the outer plate 103 and the inner plate 104 of each trailing arm 102 for reinforcing and strengthening the respective trailing arms 102. The upper and lower reinforcing plates 112 and 114 are welded to the outer plate 103 and the inner plate 104.

Leading portions 115 of the outer plate 103 and the inner plate 104 form the mounting brackets 60 of the main mounting bracket 57 of the main mounting means of each trailing arm 102 for coupling the forward suspension unit 100 to the corresponding one of the pair of the main forward transverse pivot shafts 63.

In this embodiment of the invention the main forward pivot shafts 63 are similar to the main forward transverse pivot shafts 63 of the forward suspension unit 32 of the wheeled work vehicle 1, and are pivotally carried in corresponding main forward pivot mountings 65, which are similar to the main forward pivot mountings 65 mounted on respective opposite sides of the forward chassis part 4.

The trailing arms 102 of the forward suspension unit 100 are joined by a connecting member, which in this embodiment of the invention is also provided by a torsion shaft 117 similar to the torsion shaft 68 of the forward suspension unit 32 of the wheeled work vehicle 1. The torsion shaft 117 is rigidly connected at its opposite ends to the respective trailing arms 102. The torsion shaft 117 terminates at its opposite ends in respective flanges 118 which are rigidly welded to the leading portions 115 of the inner plate 104 which forms one of the mounting brackets 60 of the main mounting bracket 57. The torsion shaft 117 defines a torsional axis 119 which coincides with the main forward transverse pivot axis 59, and the torsion shaft 117 is configured to permit limited upward and downward pivotal type torsional deflection of the trailing arms 102 relative to each other, as already described with reference to the forward suspension unit 32 of the wheeled work vehicle 1.

Otherwise, the forward suspension unit 100 of this embodiment of the invention is similar to the forward suspension unit 32 described with reference to the wheeled work vehicle 1, and its mounting in the wheeled work vehicle 1 is similar to the mounting of the forward suspension unit 32 in the wheeled work vehicle 1 as described with reference to FIGS. 1 to 9.

Referring now to FIGS. 15 and 16 the rearward suspension unit 101 is substantially similar to the forward suspension unit 100, and similar components are identified by the same reference numerals. The main difference between the rearward suspension unit 101 and the forward suspension unit 100 is that trailing arms 120 of the rearward suspension unit 101 are longer between the leading and trailing ends 36 and 37 thereof than the trailing arms 102 of the forward suspension unit 100, and additionally, the rearward rotational axes 90 about which the rearward ground engaging wheels 30 are rotatable is spaced apart rearwardly from the main rearward transverse pivot axis 88 a distance greater than the distance that the rearward rotational axis 55 of the forward ground engaging wheels 29 are spaced apart rearwardly from the main forward transverse pivot axis 59, as already described with reference to the wheeled work vehicle 1.

Otherwise, the rearward suspension unit 101 is similar to the forward suspension unit 100, and its mounting in the wheeled work vehicle 1 is similar to the mounting of the rearward suspension unit 33 in the wheeled work vehicle 1.

The operation of the wheeled work vehicle 1 with the forward and rearward suspension units 32 and 33 replaced with the forward and rearward suspension units 100 and 101 is similar to the operation of the wheeled work vehicle 1 when incorporating the forward and rearward suspension units 32 and 33, as already described with reference to FIGS. 1 to 9. Additionally, the advantages of the wheeled work vehicle 1 with the forward and rearward suspension units 32 and 33 replaced with the forward and rearward suspension units 100 and 101 are similar to the advantages achieved by the wheeled work vehicle 1 with the forward and rearward suspension units 32 and 33.

While the wheeled work vehicles have been described as comprising a forward chassis part and a rearward chassis part pivotally coupled together adjacent a substantially vertical axis for steering of the vehicle, it will be readily apparent to those skilled in the art that the wheeled work vehicles could be of the type comprising a single rigid chassis, and in which case either or both the forward ground engaging wheels, and the rearward ground engaging wheels would be steerable.

It will also be appreciated that while the wheeled work vehicles have been described as comprising both the front and rear ground engaging wheels being mounted on respective forward and rearward suspension units, in certain cases, it is envisaged that only the forward ground engaging wheels may be carried on a suspension unit according to the invention. Alternatively, it is envisaged that the wheeled work vehicle could be provided with only the rearward ground engaging wheels being carried on a suspension unit according to the invention.

While the suspension units have been described as being of a specific construction, needless to say, the suspension units may be of any other suitable construction besides those described. While the connecting member of each suspension unit has been described as comprising a torsion shaft extending between the trailing arms adjacent the leading ends thereof, and being coaxial with the main transverse pivot axis defined by the suspension unit, while the torsion shaft may be located adjacent the leading end of the trailing arms, it need not necessarily be located with the torsional coinciding with the main transverse pivot axis of the suspension unit. Indeed, in certain cases, it is envisaged that the torsion shaft may extend between the trailing arms at a location rearwardly, forwardly, upwardly or downwardly of the main transverse pivot axis of the suspension unit.

It will also be appreciated that the torsion shaft may be of any other suitable transverse cross-section besides being of circular transverse cross-section. Further, it is envisaged in certain cases that the torsion shaft may be provided as a solid torsion shaft of any suitable transverse cross-section.

It is also envisaged that while the connecting members of the respective suspension units have been described as comprising a torsion shaft, in certain cases, it is envisaged that the connecting member need not necessarily comprise a torsion shaft.

It will also be appreciated that while the coupling means for coupling the trailing arms adjacent the trailing end thereof to the shock absorbing elements so that the minimum vertical spacing between the trailing arms and the chassis can be adjustable, while this is desirable, it is not essential, and in certain cases, the coupling means may be provided without any adjustment.

Indeed, in certain cases, it is envisaged that the coupling means for coupling the suspension unit to the shock absorbing elements may be located at any desirable locations on the suspension unit. Indeed, in certain cases, it is envisaged that a single coupling means may be provided for coupling the suspension unit to a single shock absorbing element, and in which case each suspension unit would be suspended from the chassis by a single shock absorbing element.

While specific shock absorbing elements have been described any other suitable shock absorbing elements may be used.

It will also be appreciated that while the suspension units according to the invention have been described as being located in a particular type of wheeled work vehicle, the suspension units may be provided and configured for mounting in any other wheeled work vehicle.

While the wheeled work vehicle has been described as being provided with all four wheels driveable, and all four wheels driveable independently of each other, it is envisaged that in certain cases, the wheeled work vehicle may be driven by only two wheels, which may be the pair of forward ground engaging wheels or the pair of rearward ground engaging wheels, and in which case, the wheels may be driven independently or otherwise of each other. Needless to say, when the wheeled work vehicle is provided with all four wheels being driven, the wheels may be driven independently of each other, in pairs or otherwise.

Additionally, it will be appreciated that while the suspension units of the wheeled work vehicle have been described as being configured with the wheel carrying arms as trailing arms extending rearwardly from the torsion shaft, the suspension units may be configured with the wheel carrying arms configured as leading arms whereby the wheel carrying arms would extend generally forwardly from the torsion shaft. It will also be appreciated that in certain cases, one of the suspension units may be configured with the wheel carrying arms extending rearwardly from the torsion shaft, while the other suspension unit of the wheeled work vehicle would be configured with the wheel carrying arms extending forwardly from the torsion shaft.

It will also be appreciated that in certain cases, the torsion shaft may extend the full width of the suspension unit, and in which case, the wheel carrying arms would extend directly from the torsion shaft. Indeed, in certain cases, it is envisaged that the pivot mounting of the suspension unit in that case could be located within the torsion shaft. It is also envisaged that the wheel carrying arms may be rigidly connected to and extend from a corresponding single main transverse pivot shaft, and in which case, the main transverse pivot shaft could act as a torsion shaft, as well as the main transverse pivot shaft for the suspension unit. In which case, the main transverse pivot shaft would be pivotally connected to the chassis about the corresponding main transverse pivot axis. Indeed, it is also envisaged that the main transverse pivot shaft may not necessarily be configured as a torsion shaft.

It will also be appreciated that the suspension units described herein instead of being pivotally carried on a pair of main transverse pivot shafts, each suspension unit may be pivotally carried on a corresponding single main transverse pivot shaft, which could extend through the bore of the corresponding torsion shaft.

It will also be appreciated that while each suspension unit has been described as being coupled to the chassis by a pair of shock absorbing elements, in certain cases, it is envisaged that a single shock absorbing element may be sufficient for coupling each suspension unit to the chassis.

Needless to say, it will be appreciated that while the suspension units have been described as being pivotally coupled to the corresponding chassis part by pivot mountings which include rubber bushings, any other suitable bushing or bearings may be provided.

While the ground engaging wheels have been described as being driven by hydraulic motors through hubs, it is envisaged that in certain cases, the hubs may be driven by hydraulic or electric motors through hubs of the type sold under the Trade Mark TORQUE HUBS.

While the wheeled work vehicle has been described as being suitable for carrying attachments, this is not essential, the wheeled work vehicle need not necessarily be configured to carry attachments.

While the wheeled work vehicle has been described as comprising a three point linkage located at the front of the wheeled work vehicle, the three point linkage may be dispensed with. Needless to say, a three point linkage or any other suitable mounting means may be provided to the rear of the wheeled work vehicle. Needless to say, instead of a three point linkage being provided to the front of the wheeled work vehicle, any other suitable mounting means may be provided to the front of the wheeled work vehicle for mounting an attachment or other device to the wheel work vehicle.

While the shock absorbing elements have been described as being adjustably coupled to the suspension units, while this is desirable it is not essential.

The invention claimed is:

1. A suspension unit for a wheeled work vehicle, the suspension unit comprising:
    a pair of spaced apart wheel carrying arms for carrying respective ground engaging wheels,
    a main mounting means defining a main transverse pivot axis and configured for pivotally connecting the suspension unit to a chassis of a wheeled work vehicle with the main transverse pivot axis extending transversely of the direction of normal forward motion of the work vehicle and with the wheel carrying arms extending in one of a generally rearward direction and a generally forward direction from the main transverse pivot axis,
    an elongated connecting member extending substantially parallel to the main transverse pivot axis between the wheel carrying arms and connecting the wheel carrying arms for retaining the wheel carrying arms in the spaced apart disposition, the connecting member being one of located relatively closely to the main transverse pivot axis, located adjacent the main transverse pivot axis and located substantially coinciding with the main transverse pivot axis, and
    at least one coupling means located on the suspension unit spaced apart from the main transverse pivot axis for coupling the suspension unit to a shock absorbing element configured for coupling between the suspension unit and the chassis of the wheeled work vehicle, the at least one coupling means being configured for adjustably coupling the suspension unit to the shock absorbing element for varying the minimum vertical spacing between distal ends of the respective wheel carrying arms and the chassis.

2. A suspension unit as claimed in claim 1 in which a pair of the coupling means are provided one coupling means being provided on each wheel carrying arm, the coupling means being configured for coupling the wheel carrying arms to respective corresponding shock absorbing elements.

3. A suspension unit as claimed in claim 2 in which the at least one coupling means comprises at least two individually selectable coupling points therein for coupling the suspension unit to the shock absorbing element.

4. A suspension unit as claimed in claim 2 in which each coupling means is located adjacent a distal end of the corresponding wheel carrying arms.

5. A suspension unit as claimed in claim 1 in which the main mounting means are located on the respective wheel carrying arms adjacent proximal ends of the respective wheel carrying arms.

6. A wheeled work vehicle comprising
    a chassis, the chassis comprising:
        a forward chassis part and
        a rearward chassis part, the rearward chassis part being pivotally coupled to the forward chassis part about a substantially vertically extending primary pivot axis for steering of the vehicle by
        a lower primary pivot mounting and an upper primary pivot mounting spaced apart above the lower primary pivot mounting,
        the lower primary pivot mounting being directly coupled to the forward and rearward chassis parts defining the primary pivot axis, and
        the upper primary pivot mounting being directly coupled to one of the forward and rearward chassis parts defining the primary pivot axis, and to the other one of the forward and rearward chassis parts through a link member, the link member being coupled directly to the upper primary pivot mounting about the primary pivot axis and to the said other one of the forward and rearward chassis parts through a secondary pivot mounting about a substantially vertically extending secondary pivot axis spaced apart in a direction generally forwardly/rearwardly from the primary pivot axis, and
        the lower and upper primary pivot mountings and the secondary pivot mounting being configured to permit limited pivoting of the forward chassis part and the rearward chassis part relative to each other about a substantially horizontally extending imaginary pivot axis to accommodate the wheeled work vehicle over uneven ground, and
    a suspension unit pivotally coupled to one of the forward and rearward chassis parts about a main transverse pivot axis with the main transverse pivot axis extending transversely of the direction of normal forward motion of the wheeled work vehicle, the suspension unit comprising:
        a pair of spaced apart wheel carrying arms,
        a main mounting means defining the main transverse pivot axis and configured for pivotally connecting the suspension unit to the one of the forward and rearward chassis parts with the wheel carrying arms extending in one of a generally rearward direction and a generally forward direction from the main transverse pivot axis,
        each wheel carrying arm carrying one of a pair of ground engaging wheels with the rotational axes of the respective ground engaging wheels one of trailing and leading the main transverse pivot axis, and
        an elongated connecting member extending substantially parallel to the main transverse pivot axis between the wheel carrying arms and connecting the wheel carrying arms for retaining the wheel carrying arms in the spaced apart disposition, the connecting member being one of located relatively closely to the main transverse pivot axis, located adjacent the main transverse pivot axis and located substantially coinciding with the main transverse pivot axis.

7. A wheeled work vehicle as claimed in claim 6 in which the connecting member is rigidly connected to the wheel carrying arms.

8. A wheeled work vehicle as claimed in claim 6 in which the connecting member comprises an elongated torsion shaft defining a torsional axis about which limited pivotal type deflection of the wheel carrying arms relative to each other is permitted.

9. A wheeled work vehicle as claimed in claim 8 in which the torsion shaft is connected to the wheel carrying arms with the torsional axis substantially coinciding with the main transverse pivot axis.

10. A wheeled work vehicle as claimed in claim 6 in which at least one shock absorbing element is coupled between the at least one suspension unit and the chassis.

11. A wheeled work vehicle comprising:
    a chassis, and
    at least one suspension unit coupled to the chassis and carrying a pair of spaced apart ground engaging wheels thereon, the suspension unit comprising:
        a pair of spaced apart wheel carrying arms rotatably carrying the respective ground engaging wheels, a drive motor mounted on each wheel carrying arm on an inner side thereof for driving the corresponding ground engaging wheel, a main mounting means defining a main transverse pivot axis pivotally connected to the chassis with the main transverse pivot axis extending transversely of the direction of normal forward motion of the vehicle and with the wheel carrying arms extending in one of a generally rearward direction and a generally forward direction from the main transverse pivot axis, and an elongated connecting member extending substantially parallel to the main transverse pivot axis between the wheel carrying arms and connecting the wheel carrying arms for retaining the wheel carrying arms in the spaced apart disposition, to accommodate the chassis therebetween with the chassis located between the respective drive motor, the connecting member being one of located relatively closely to the main transverse pivot axis, located adjacent the main transverse pivot axis and located substantially coinciding with the main transverse pivot axis.

12. A wheeled work vehicle as claimed in claim 11 in which the connecting member of the at least one suspension unit is rigidly connected to the wheel carrying arms thereof.

13. A wheeled work vehicle as claimed in claim 11 in which the connecting member of the at least one suspension unit comprises an elongated torsion shaft defining a torsional axis about which limited pivotal type deflection of the wheel carrying arms relative to each other is permitted, the torsion shaft being connected to the wheel carrying arms with the torsional axis thereof extending substantially parallel to the main transverse pivot axis and being one of located relatively closely to the main transverse pivot axis, located adjacent the main transverse pivot axis and located substantially coinciding with the main transverse pivot axis.

14. A wheeled work vehicle as claimed in claim 11 in which the connecting member comprises a hollow shaft.

15. A wheeled work vehicle as claimed in claim 11 in which at least one main pivot mounting is located on the chassis and defines the main transverse pivot axis, the main pivot mounting pivotally engaging the main mounting means of the at least one suspension unit for pivotally coupling the suspension unit to the chassis.

16. A wheeled work vehicle as claimed in claim 11 in which at least one shock absorbing element is coupled between the at least one suspension unit and the chassis, and an adjusting means is provided for adjustably coupling the at least one suspension unit to the chassis through the shock absorbing element for varying the minimum vertical spacing between the distal ends of the wheel carrying arms and the chassis.

17. A wheeled work vehicle as claimed in claim 11 in which each wheel carrying arm rotatably carries a corresponding one of the ground engaging wheels about a rotational axis spaced apart from the main transverse pivot axis towards the distal end thereof.

18. A wheeled work vehicle as claimed in claim 11 in which the wheel carrying arms are configured as one of trailing arms and leading arms.

19. A wheeled work vehicle as claimed in claim 11 in which two suspension units are provided, one of the suspension units comprising a forward suspension unit coupled to the chassis towards the forward ends thereof carrying a forward pair of the ground engaging wheels, and a rearward suspension unit coupled to the chassis towards a rearward end thereof carrying a rearward pair of the ground engaging wheels.

20. A wheeled work vehicle as claimed in claim 15 in which a pair of the main pivot mountings are located spaced apart transversely on the chassis defining the main transverse pivot axis, and a pair of the main mounting means are provided spaced apart transversely on the at least one suspension unit for pivotally engaging the respective main pivot mountings about the main transverse pivot axis.

21. A wheeled work vehicle as claimed in claim 11 in which the chassis comprises a forward chassis part and a rearward chassis part, the rearward chassis part being pivotally coupled to the forward chassis part about a substantially vertically extending primary pivot axis for steering of the vehicle, and one of the suspension units is mounted on the forward chassis part, and one of the suspension units is mounted on the rearward chassis part.

22. A wheeled work vehicle as claimed in claim 21 in which the forward and rearward chassis parts are pivotally coupled about the primary pivot axis by a lower primary pivot mounting and an upper primary pivot mounting spaced apart above the lower primary pivot mounting together defining the primary pivot axis, the lower primary pivot mounting being directly coupled to the forward and rearward chassis parts, the upper primary pivot mounting being coupled directly to the one of the forward and rearward chassis parts and to the other one of the forward and rearward chassis parts through a link member, the link member being coupled directly to the upper primary pivot mounting, and to the said other one of the forward and rearward chassis parts through a secondary pivot mounting about a substantially vertically extending secondary pivot axis spaced apart from the primary pivot axis, the primary and the secondary pivot axes being spaced apart in a generally forwardly rearwardly direction relative to the direction of normal forward motion of the wheeled work vehicle, and the lower and upper primary pivot mountings and the secondary pivot mounting define respective substantially horizontally extending swivel axes for permitting limited relative tilting of one of the forward and rearward chassis parts relative to the other about an imaginary horizontal axis to accommodate the vehicle over uneven ground.

23. A suspension unit for a wheeled work vehicle, the suspension unit comprising:

a pair of spaced apart wheel carrying arms rotatably carrying respective ground engaging wheels, a main mounting means defining a main transverse pivot axis and configured for pivotally connecting the suspension unit to a chassis of the wheeled work vehicle with the main transverse pivot axis extending transversely of the direction of normal forward motion of the vehicle and with the wheel carrying arms extending in one of a generally rearward direction and a generally forward direction from the main transverse pivot axis, and an elongated torsion shaft defining a torsional axis and extending between and being rigidly connected to the wheel carrying arms with the torsional axis thereof extending substantially parallel to the main transverse pivot axis and being located one of relatively closely to the main transverse pivot axis, adjacent the main transverse pivot axis, and substantially coinciding with the main transverse pivot axis, the torsion shaft retaining the wheel carrying arms in the spaced apart disposition and permitting limited pivotal type deflection of the wheel carrying arms relative to each other.

24. A suspension unit as claimed in claim 23 in which the torsion shaft comprises a hollow shaft.

25. A suspension unit as claimed in claim 23 in which a pair of the main mounting means are provided, the main mounting means being located adjacent the respective opposite ends of the torsion shaft for engaging corresponding main pivot mountings on the chassis.

26. A suspension unit as claimed in claim 25 in which each main mounting means comprises at least one main mounting bracket having one of a main bore extending therethrough, and a main pivot shaft extending therefrom, the one of the main bore and the main pivot shaft defining the main transverse pivot axis.

\* \* \* \* \*